(12) United States Patent  (10) Patent No.: US 11,815,742 B2
Leuenberger et al.  (45) Date of Patent: Nov. 14, 2023

(54) TUNABLE NON-ROUND SPECTACLES WITH IMMERSED LENS SHAPER

(71) Applicant: OPTOTUNE AG, Dietikon (CH)

(72) Inventors: David Leuenberger, Winterthur (CH); Michael Büeler, Vogelsang (CH); Roman Patscheider, Winterthur (CH); Pit Gebbers, Ehrendingen (CH); Christopher Laning, Windisch (CH); Manuel Aschwanden, Allenwinden (CH)

(73) Assignee: OPTOTUNE AG, Dietikon (CH)

( * ) Notice: Subject to any disclaimer, the term of this patent is extended or adjusted under 35 U.S.C. 154(b) by 444 days.

(21) Appl. No.: 16/761,269

(22) PCT Filed: Nov. 5, 2018

(86) PCT No.: PCT/EP2018/080206
§ 371 (c)(1),
(2) Date: May 4, 2020

(87) PCT Pub. No.: WO2019/086679
PCT Pub. Date: May 9, 2019

(65) Prior Publication Data
US 2020/0285077 A1  Sep. 10, 2020

(30) Foreign Application Priority Data
Nov. 5, 2017 (EP) .................................. 17200038

(51) Int. Cl.
G02C 7/08  (2006.01)
(52) U.S. Cl.
CPC ..................... G02C 7/085 (2013.01)
(58) Field of Classification Search
CPC . G02C 7/08; G02C 7/085; G02B 3/14; G02B 13/0075; G02B 15/00; G02B 15/20;
(Continued)

(56) References Cited

U.S. PATENT DOCUMENTS 5,668,620 A  9/1997  Kurtin
6,040,947 A  3/2000  Kurtin
(Continued)

FOREIGN PATENT DOCUMENTS

CN  201352278  11/2009
CN  101726865  6/2010
(Continued)

*Primary Examiner* — Mustak Choudhury
(74) *Attorney, Agent, or Firm* — JMB Davis Ben-David

(57) ABSTRACT

The invention relates to an optical device (1), comprising: at least a first lens (100) having an adjustable focal length, wherein the first lens (100) comprises a container (2) comprising at least one reservoir volume (90) and a lens volume (91) which are in flow communication via a channel (92) and filled with a transparent fluid (F), and wherein the container (2) comprises a stretchable transparent membrane (21) and a transparent lens shaper (22) that is immersed in the fluid (F) and connected to the membrane (21), so that the lens shaper (22) defines a curvature-adjustable area (23) of the membrane (21), and wherein the container (2) comprises a transparent back wall (30) facing the membrane (21), wherein the fluid (F) is arranged between the membrane (20) and the back wall (30). According to the present invention, the at least one reservoir volume (90) is covered by a wall (21), wherein a plunger (94) for interacting with an actuator part (e.g. an electropermanent magnet (80)) is arranged in the at least one reservoir volume (90) and connected to the wall (93) so that fluid (F) is pumped from the lens volume (91) into the at least one reservoir volume (90) when the plunger (94) is attracted h the electropermanent magnet (80) whereby the curvature of the curvature-adjustable area (23) and therewith said focal length is changed.

20 Claims, 15 Drawing Sheets

(58) Field of Classification Search
CPC .. G02B 15/142; H04N 5/2254; H01F 7/0226; H01F 7/1646; F03G 7/065; A61F 2/145; A61F 2/1613; A61F 2/1635
See application file for complete search history.

(56) References Cited

U.S. PATENT DOCUMENTS

| | | |
|---|---|---|
| 2004/0184158 A1 | 9/2004 | Shadduck |
| 2009/0251792 A1 | 10/2009 | Suzuki |
| 2010/0045930 A1* | 2/2010 | Silver .................... G02C 7/085 359/666 |
| 2010/0202054 A1 | 8/2010 | Niederer |
| 2010/0208195 A1* | 8/2010 | Gupta .................... G02B 3/14 359/666 |
| 2012/0069450 A1 | 3/2012 | Bolis |
| 2012/0140168 A1 | 6/2012 | Kurtin |
| 2012/0287512 A1 | 11/2012 | Egan et al. |
| 2013/0229617 A1 | 9/2013 | Kurtin |
| 2017/0296421 A1* | 10/2017 | Travers .................... A61H 5/00 |

FOREIGN PATENT DOCUMENTS

| | | | |
|---|---|---|---|
| CN | 103329030 | 9/2013 | |
| JP | 1986061137 | 4/1986 | |
| JP | 06161137 | 6/1994 | |
| JP | H-10502179 | 2/1998 | |
| JP | 2000081503 | 3/2000 | |
| JP | 2007531912 | 11/2007 | |
| JP | 2009271095 | 11/2009 | |
| JP | 201268638 | 4/2012 | |
| JP | 2016510430 | 4/2016 | |
| JP | 2017522587 | 8/2017 | |
| WO | 2010104904 | 9/2010 | |
| WO | WO-2010104904 A2 * | 9/2010 | ......... G02B 26/0825 |
| WO | 2011046956 | 4/2011 | |
| WO | 2015052236 | 4/2015 | |
| WO | 2015184412 | 12/2015 | |
| WO | 2015185673 | 12/2015 | |
| WO | 2018028847 | 2/2018 | |

* cited by examiner

TUNABLE NON-ROUND SPECTACLES WITH IMMERSED LENS SHAPER

CROSS-REFERENCE TO RELATED APPLICATIONS

This is the U.S. National Stage of International Application No PCT/EP2018/080206 filed on Nov. 5, 2018 which was published in English under PCT Article 21(2), which in turn claims priority to European Patent Application No. 17200038.2 filed on Nov. 5, 2017.

The present invention relates to an optical device, particularly in the form of a lens, particularly for a spectacle. Further, particularly, the invention relates to spectacles comprising such lenses.

More particularly, such a lens is at least in part fluid- or liquid-filled and has an adjustable focal length.

More particularly, the present invention relates to designs and methods of how to use and control such dynamic lenses.

The present invention is not only applicable to spectacle lenses but also to other lenses that may be used in a variety of different applications such as but not limited to diopter control in viewfinders, virtual reality (VR) and augmented reality (AR) systems, particularly spectacles for VR or AR.

Myopia (nearsightedness) refers to the condition of defect vision of distant objects. Hyperopia (farsightedness) refers to the condition of defect vision of near objects. Both Myopia and Hyperopia are related to the refractive power of eye with respect to the size of the eyeball and are constant over the life.

Prespiopia (farsightedness) is a condition caused by loss of elasticity of the lens of the eye. It reduces the ability of the human eye to accommodate, i.e. to alter the focal length of the natural eye. It is occurring typically in middle and old age.

Accommodation in human beings is reduced to 3 D (diopters) or less at an age range of 35-45 years. At that point, reading glasses or some other form of near vision correction becomes necessary for the human eye to be able to focus on near objects.

Having to switch between spectacles with different optical power can be prevented by using either bifocal, multifocal or progressive spectacle lenses or contact lenses. In case of progressive lenses, a "corridor" of optimum lens power runs vertically down each progressive lens. In contrast to bifocals and trifocals a smooth change of focus from distance to near occurs without image jump.

A large segment of the population requires a different visual correction for each eye. These people, known as anisometropes, require different visual correction for each eye for maximum visual comfort.

Adjustable optical lens systems comprising fluids are ideally suited for spectacles because of their compact size, low weight, and continuous adjustment of optical power. In case of an electrically controlled lens the fast switching speed and the low electrical power are key benefits.

Adjustable optical lens systems comprising fluids are known from the prior art.

WO07049058 is directed to a lens with a variable focus, which comprises a rigid ring to which a flexible membrane is attached. A rigid transparent front cover is attached to the flexible membrane and a rigid rear cover on the rear surface of the ring. A cavity is formed between the flexible membrane and the rear cover which is filled with a liquid. The amount of liquid in the cavity can be adjusted to vary the curvature of the flexible membrane and so vary the optical characteristics of the lens. A second flexible membrane can be positioned between the rear cover and the ring.

Further, WO06011937 is directed to a fluidic adaptive lens device with at least one flexible membrane (indicated as first partition). The adaptive lens includes a first flexible and optically transparent membrane. A second partition, which is coupled to the flexible membrane, is at least partially optically transparent. A first cavity is formed in between the flexible membrane and the second partition. The lens device comprises a fluid within the cavity. Furthermore, the device comprises means, e.g. a Teflon coated screw, to control the pressure or the volume of the fluid in the chamber. When the parameter of the fluidic medium changes, the membrane flexes and the optical property of the lens changes.

Further, US2003095336 describes a lens arrangement mainly for a corrective or a prescription lens. The prescription lens is adjacent to a fluid cell which has a flexible membrane and a base. In that fluid is pumped into or out of the fluid cell the corrective power of the entire lens arrangement is varied.

Furthermore, fluid lenses have also been proposed for ophthalmic applications (see, e.g. U.S. Pat. No. 7,085,065).

Furthermore, fluid lenses designed for the purpose of tunable spectacles are described in the subsequent paragraphs.

U.S. Pat. No. 8,414,121 B2 describes non-round tunable fluid lens assembly where the thickness of the membrane includes thickness contours to partially cancel out asphericity (especially astigmatism) at a particular stage of inflation of the membrane. In consequence a complicated fitting and optimization procedure is required for each specific shape of spectacle frame.

Further, US 2012/0087014 describes a liquid actuation mechanism integrated into the brackets of the spectacles. Fluid is pumped from the reservoir inside the bracket into the optical aperture via a flexible tubing.

Furthermore, US 2012/0287512 A1 describes different actuator mechanism for an adjustable fluid-filled lens, including magnetic, mechanical and thermal, all integrated into the bracket of the spectacles. In some embodiments, an adjustable fluid-filled lens includes a septum configured to be pierceable by a needle and automatically and fluidly seal a chamber after withdrawal of the needle.

Furthermore, US 2012/0087015 A1 describes an embodiment of a piezo-electrically controlled fluid reservoir which is integrated into the perimeter of the lens module.

Based on the above, the problem underlying the present invention is to provide a versatile optical device for vision correction.

This problem is solved by an optical device having the features of claim 1.

Preferred embodiments of the optical device are stated in the corresponding sub claims and are described below.

According to claim 1, an optical device is disclosed, comprising: at least a first lens having an adjustable focal length, wherein the first lens comprises a container comprising at least one reservoir volume and a lens volume which are in fluid flow communication via a channel and filled with a transparent fluid (e.g. a liquid), and wherein the container comprises a stretchable transparent membrane and a transparent lens shaper contacting the fluid and connected to the membrane, so that the lens shaper defines a curvature-adjustable area of the membrane, and wherein the container comprises a transparent back wall facing the membrane, wherein the fluid is arranged between the membrane and the back wall. According to the present invention, the reservoir volume is covered by a wall, wherein a plunger for being attracted by an actuator part (e.g. an electropermanent magnet) is arranged in the reservoir volume and connected to the wall so that fluid is pumped from the lens volume into the reservoir volume when the plunger is attracted by the actuator part (e.g. electropermanent magnet) whereby the curvature of the curvature-adjustable area and therewith said focal length is changed.

According to a preferred embodiment, said wall is a stretchable wall. Particularly, in all embodiments, the transparent fluid can be a transparent liquid (and vice versa).

Due to the fact, that the membrane can be elastically deformed for adjusting the curvature of said area, said container and the fluid residing therein form a focus adjustable (or tunable) lens.

Particularly, the fact that the lens shaper contacts the membrane can mean that the lens shaper contacts the membrane directly or indirectly via another material layer (e.g. formed by a glue etc.). The lens shaper can further be attached to the membrane by bonding it directly to the membrane or via another material layer such as a glue layer.

Particularly, the notion according to which the lens shaper defines an area of the membrane that has an adjustable curvature may mean that the lens shaper delimits, by being attached to the membrane or by contacting the latter, an elastically expandable (e.g. circular) area of the membrane, wherein particularly said area extends up to an (e.g. circumferential) inner edge of the opening formed in the lens shaper.

When the pressure of the fluid residing in the lens volume changes due to fluid being pumped in or out of the lens volume the curvature-adjustable area of the membrane changes its curvature accordingly. Particularly, said area of the membrane may change its curvature from a concave state via a flat state to a convex state.

Generally, the membrane can be made of at least one of the following materials: a glass, a polymer, an elastomer, a plastic or any other transparent and stretchable or flexible material. For example, the membrane may be made out of a silicone-based polymer such as poly(dimethylsiloxane) also known as PDMS or a polyester material such as PET or a biaxially-oriented polyethylene terephtalate (e.g. "Mylar").

Further, the membrane can comprise a coating. Such coating can for example reduce the reflection loss at the membrane-air interface. It can also have a different function such as an anti-fog function. Further, the membrane can also be structured, e.g. comprises a structured surface or have a variable thickness or stiffness across the membrane.

Further, said fluid residing in the container preferably is or comprises a liquid metal, a gel, a liquid, a gas, or any transparent, absorbing or reflecting material which can be deformed. For example, the fluid may be a silicone oil (e.g. Bis-Phenylpropyl Dimethicone). Additionally, the fluid may include fluorinated polymers such as perfluorinated polyether (PFPE) inert fluid.

Furthermore, according to an embodiment of the optical device according to the present invention, the (e.g. stretchable) wall is formed by said membrane (e.g. by a region of said membrane), which covers said reservoir volume and said lens volume.

Furthermore, according to an embodiment of the optical device according to the present invention, the optical device comprises an actuator unit comprising said plunger and said actuator part (e.g. electropermanent magnet) for interacting with said plunger, wherein the plunger comprises a counter member (e.g. a magnetic flux guiding countermember) attractable by the actuator part, so that fluid is pumped from the lens volume into the reservoir volume when the counter member is attracted by the actuator part whereby the curvature of the curvature-adjustable area and therewith said focal length is changed.

Furthermore, according to an embodiment, the counter member is a permanent magnet.

Furthermore, according to an alternative embodiment, the counter member is a magnetic flux guiding counter member.

Furthermore, according to an embodiment, the actuator part is an electropermanent magnet.

Furthermore, according to an embodiment of the optical device according to the present invention, the counter member faces the electropermanent magnet.

Further, according to an embodiment of the present invention, the electropermanent magnet is configured to generate an external magnetic field for attracting said counter member for adjusting (particularly decreasing) the curvature of said curvature-adjustable area of the membrane, e.g. for changing the curvature of said area from a convex state to a less convex state or even to a flat or concave state.

Particularly, said external magnetic field can be turned on or off by applying a corresponding electrical current pulse to a coil of the electropermanent magnet, which coil encloses a (e.g. second) magnet of the electropermanent magnet, whose magnetization can be switched by a magnetic field generated by the coil upon applying said current pulse to the coil.

Further, according to an embodiment of the present invention, the electropermanent magnet comprises a first magnet having a first coercivity (e.g. a "hard" magnetic material) and a first magnetization, and wherein the electropermanent magnet further comprises a second magnet having a second coercivity (e.g. a "soft" or "semi hard" magnetic material) and a second magnetization, wherein the first coercivity is larger than the second coercivity, and wherein the electropermanent magnet further comprises a coil encompassing the second magnet such that by applying a corresponding current to the coil the second magnet can be partially magnetized to generate an external magnetic field of pre-defined strength for achieving a continuous adjustment of the curvature of said curvature-adjustable area or such that by applying a corresponding current the second magnetization of the second magnet can be switched from a parallel state where the two magnetizations are parallel to an antiparallel state where the two magnetizations are antiparallel (and vice versa), wherein when the second magnetization is in the parallel state the electropermanent magnet generates said external magnetic field, and wherein when the second magnetization is in the antiparallel state said external magnetic field vanishes.

In other words, in case the magnetically hard and soft materials (first and second magnet) have opposing magnetizations the magnet produces no net external field across its poles, while when their direction of magnetization is aligned, the electropermanent magnet produces an external magnetic field, which attracts the respective counter member. Further, as described above, it is not necessary to fully magnetize the second magnet, but one can also merely partially magnetize the magnet to adjust the force of the respective electropermanent magnet in a continuous fashion. This operation is also denoted as analog mode. Further, according to an embodiment, the electropermanent magnet comprises two pole members, particularly consisting of a soft magnetic material, namely a first pole member arranged at a first end of the first magnet and at a first end of the second magnet, and a second pole member arranged at a second end of the first magnet and at a second end of the second magnet.

Because the pole members have a higher permeability than air, they concentrate the magnetic flux of the magnets. Particularly, when the magnetizations are antiparallel, the magnetic flux is short-circuited at the ends of the magnets via the respective pole member. In case the magnetizations are parallel, the magnetic flux is guided from one pole member to the associated counter member and back to the other pole member.

Furthermore, according to an embodiment, the actuator part comprises a single magnetizable member (e.g. formed out of a magnetically soft material) and a coil encompassing the magnetizable member, wherein the actuator unit is configured to magnetize the magnetizable member by applying an electrical current pulse to the coil such that the magnetizable member is magnetized and attracts said counter member for adjusting the curvature of said curvature-adjustable area, and wherein particularly the actuator unit is configured to apply an electrical current pulse to the magnetizable member to demagnetize the magnetizable member.

Furthermore, according to an embodiment, the actuator part comprises a coil, wherein the actuator unit is configured to apply an electrical current to the coil such that the coil generates a magnetic field that attracts or repels the counter member for adjusting the curvature of said curvature-adjustable area. Here particularly, said counter member is a permanent magnet and the actuator unit particularly forms a voice coil motor.

Furthermore, according to an embodiment of the optical device according to the present invention, the optical device comprises a frame for holding said container, wherein the actuator part (e.g. electropermanent magnet) is arranged on a portion of the frame so that the actuator part faces the associated counter member.

Furthermore, according to an embodiment of the optical device according to the present invention, said portion of the frame faces the reservoir volume in a direction running parallel to the optical axis of the at least one first lens, particularly such that said portion of the frame covers the reservoir volume.

Furthermore, according to an embodiment of the optical device according to the present invention, the reservoir volume comprises an elongated shape and extends along a longitudinal axis.

Furthermore, according to an embodiment of the optical device according to the present invention, the plunger comprises an elongated shape and extends along said longitudinal axis.

Furthermore, according to an embodiment of the optical device according to the present invention, the plunger comprises a further (e.g. magnetic flux guiding) counter member for interacting with a further actuator part (e.g. electropermanent magnet) comprised by the actuator unit, so that fluid is pumped from the lens volume into the reservoir volume when the two counter members are attracted by the respective actuator part whereby the curvature of the curvature-adjustable area and therewith said focal length is changed.

Furthermore, according to an embodiment of the optical device according to the present invention, said counter member and said further counter member face each other in the direction of said longitudinal axis.

Furthermore, according to an embodiment of the optical device according to the present invention, the further actuator part is arranged on said portion of the frame, too, so that the further actuator part faces the associated further counter member.

Furthermore, according to an embodiment, the further actuator part is one of: an electropermanent magnet (e.g. configured as described above); an actuator part comprising a single magnetizable member and a coil encompassing the magnetizable member (e.g. configured as described above).

Further, in an embodiment, the further counter member is one of: a magnetic flux guiding counter member; a permanent magnet.

Furthermore, in an embodiment, the optical device may also comprise a plurality of reservoir volumes, wherein each reservoir volume is in flow connection with the lens volume via a separate channel. Here, according to an embodiment, a plunger comprising a magnetic flux guiding counter member or formed by a magnetic flux guiding counter member, is arranged in each reservoir volume and connected to a (e.g. stretchable) wall of the respective reservoir volume. According to an embodiment, each (e.g. stretchable) wall is formed again by a region of the membrane that also covers the lens volume. The individual reservoir volume can be designed as described herein with regard to the at least one reservoir volume. Further, each counter member faces an associated electropermanent magnet (that is particularly arranged in said frame that is arranged in front of the reservoir volumes), wherein the optical device is configured to control each electropermanent magnet independently from the other electropermanent magnets. Thus, the optical device is configured to generate a plurality of different curvatures of the said curvature-adjustable area of the membrane (and therewith a plurality of corresponding focal lengths of the first lens) even when the respective electropermanent magnet merely moves the associated counter member between two stable states corresponding to a convex state of the respective (e.g. stretchable) wall (membrane region), in which the respective counter member is closest to the associated electropermanent magnet and in which the respective reservoir volume has maximal size, and a flat state of the respective wall/membrane region corresponding to a smaller volume value of the respective reservoir volume.

Further, according to an embodiment, the reservoir volumes have different volume values (e.g. with respect to a flat state of the respective reservoir volume) so as to increase the number of different focal lengths that can be selected/adjusted by the optical device. The operation mode in which the counter members are only moved between said two positions, respectively, is also denoted as bistable operation.

Furthermore, according to an embodiment of the optical device according to the present invention, the back wall may form a rigid lens.

Furthermore, according to an embodiment of the optical device according to the present invention, the back wall may form a free-form optics, such as a coma-compensation plate.

Furthermore, according to an embodiment of the optical device according to the present invention, the lens shaper comprises an (e.g circular) opening forming at least a portion of the lens volume, wherein said opening is covered by the membrane, wherein said curvature-adjustable area covers said opening.

Furthermore, according to an embodiment of the optical device according to the present invention, the lens shaper comprises an e.g. elongated recess forming at least a portion of the reservoir volume, wherein said recess is covered by the membrane, too, see also above.

Furthermore, according to an embodiment of the optical device according to the present invention, the material of the lens shaper, the membrane, and the fluid each comprise a refractive index, wherein the absolute value of the difference of any two refractive indices of these three refractive indices is smaller than 0.1, preferably smaller than 0.02.

Furthermore, according to an embodiment of the optical device according to the present invention, the container (including the plunger arranged in the reservoir volume) forms a (e.g. semi-finished) lens-blank having a circumferential boundary region that is configured to be at least one of: formed, shaped, machined, cut, sanded, milled, in order to form an outer contour of the container that fits a desired frame for holding the container.

Furthermore, according to an embodiment of the present invention, the container forms a semi-finished lens-blank that comprises a curved shape or is configured to be formed into a curved shaped. In case of an optical device in the form of spectacles (e.g. for vision correction), this allows one to adapt the container(s) more easily to a frame of the spectacles for holding the container(s).

Furthermore, according to an embodiment of the optical device according to the present invention, the optical device comprises a transparent front wall arranged in front of the membrane for protecting the membrane.

Furthermore, according to an embodiment of the optical device according to the present invention, the front wall can be a rigid lens, e.g. for providing a base refractive power.

Furthermore, according to an embodiment of the optical device according to the present invention, the back wall comprises a recess forming a part of the reservoir volume, and/or wherein the back wall comprises a recess forming a part of the lens volume. Particularly, these two recesses can form one continuous recess.

Further, according to an embodiment, the channel connecting the at least one reservoir volume to the lens volume is formed by a recess of the back wall.

Furthermore, according to an embodiment of the optical device according to the present invention, the container comprises an intermediary layer arranged between the back wall and the lens shaper, wherein said intermediary layer comprises a recess forming a part of the reservoir volume, and/or wherein intermediary layer comprises a recess forming a part of the lens volume.

Particularly, in case an intermediary layer is used, the channel connecting the at least one reservoir volume and the lens volume can also be formed by a recess of the intermediary layer.

Generally, it is also possible to form a recess into the lens shaper for forming a channel connecting the at least one reservoir volume to the lens volume, but such a recess is not preferred since it leads to a smaller optical quality of the lens due to deformations of the membrane in the region of this recess when the membrane is connected to the lens shaper.

Furthermore, according to an embodiment of the optical device according to the present invention, the container comprises a circumferential lateral inner side delimiting the lens volume, wherein said inner side comprises a rounded shape (particularly in a cross section perpendicular to the back wall). Furthermore, particularly, the inner side comprises a curvature having an inflection point. Furthermore, preferably a portion of the rounded shape is formed by the back wall, and wherein an adjacent portion of the rounded shape is formed by the lens shaper. Particularly the two portions form roundings of opposite curvature.

Furthermore, according to an embodiment of the optical device according to the present invention, the optical device comprises a sensor arranged on the wall covering the at least one reservoir volume (e.g. region of the membrane), wherein the sensor is configured to measure a curvature of said wall or a strain of said wall, wherein particularly the optical device is configured to use an output signal of the sensor as a feedback signal for controlling the actuator unit of the optical device.

Furthermore, according to an embodiment of the optical device according to the present invention, the wall comprises a bellows structure.

Furthermore, according to an embodiment of the optical device according to the present invention, the container comprises a further (e.g. passive) reservoir volume connected to the at least one reservoir volume via flow connection, and wherein the further reservoir volume is connected to the lens volume via a further channel.

Furthermore, according to an embodiment of the optical device according to the present invention, the further reservoir volume is covered by a further wall (can also be a stretchable wall formed by a region of the membrane), wherein particularly the further wall comprises a bellows structure.

Furthermore, according to an embodiment of the optical device according to the present invention, the channel, the further channel, and said flow connection are each configured to be opened or closed by means of an associated valve, wherein the actuator unit is configured to control said valves (e.g. for pumping fluid into the lens volume or out of the lens volume using e.g. the actuator part(s) and counter member(s)).

Furthermore, according to an embodiment of the optical device according to the present invention, the at least one reservoir volume and the lens volume are in flow communication via a plurality of channels. Said channels may extend side by side, particularly parallel.

Furthermore, according to an embodiment of the optical device according to the present invention, the fluid comprises a refractive index that is larger than 1.45, preferably larger than 1.55, and/or wherein the lens shaper comprises a refractive index that is larger than 1.45, preferably larger than 1.55.

Furthermore, in an embodiment, the fluid (e.g. transparent liquid) and the immersed lens shaper have equal Abbe numbers.

Furthermore, according to an embodiment, a spacer is arranged between the plunger and the membrane, which spacer comprises a surface via which the spacer is connected to the membrane, wherein this surface of the spacer is smaller than a surface of the plunger facing the membrane.

Furthermore, according to an embodiment of the optical device according to the present invention, the optical device comprises a further first lens having an adjustable focal length, wherein a waveguide is arranged between the first lens and said further first lens.

Furthermore, according to an embodiment of the optical device according to the present invention, the optical device comprises a second lens having an adjustable focal length.

Furthermore, according to an embodiment of the optical device according to the present invention, the optical device comprises a further second lens having an adjustable focal length, wherein a further waveguide is arranged between the second lens and said further second lens.

Furthermore, according to an embodiment of the optical device according to the present invention, the optical device is formed as a pair of spectacles, particularly for virtual reality or augmented reality, or a headset, particularly for virtual reality or augmented reality, wherein the respective lens is held by a frame that can be worn by a user such that the respective lens is arranged in front of an associated eye of the user.

Furthermore, according to an embodiment of the optical device according to the present invention, the optical device is configured to adjust a focal length of the first lens and a focal length of the second lens simultaneously.

Furthermore, according to an embodiment, the optical device is configured to adjust a focal length of the first lens and a focal length of the further first lens simultaneously. Particularly, this adjustment is conducted such that the total focal power of the first lens and the further first lens stays constant.

Furthermore, according to an embodiment, the optical device is configured to adjust a focal length of the second lens and a focal length of the further second lens simultaneously. Particularly, this adjustment is conducted such that the total focal power of the second lens and the further second lens stays constant.

Further features, advantages and embodiments of the present invention will be described below with reference to the Figures, wherein FIG. 1 shows the cross-section of an electrically tunable lens based on a liquid filled reservoir that is connected through a liquid channel with a single reservoir. The liquid-filled reservoir as well as the actual lens area are formed between membrane, lens shaper and back glass. A plunger containing of non-magnetic material having at least two inserts of soft magnetic material is placed inside the liquid reservoir. On the other side of the membrane there are at least two electro-permanent magnet (EPM) motors which are shown in the drawing in non-actuated state. The membrane is deflected to the outside, i.e. convex state. In this configuration the lens container consists of two layers: an etched/embossed transparent material that is bonded to the lens shaper.

Figure 5:
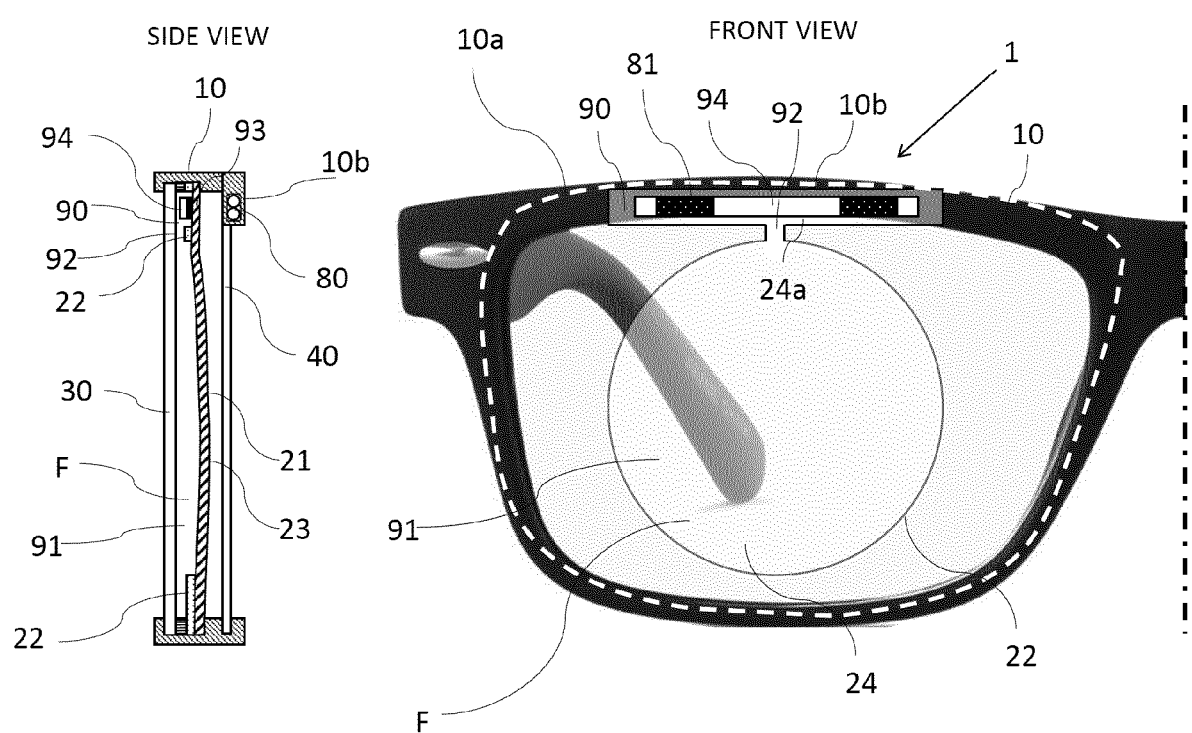

FIG. 5 shows a practical implementation where the EPM actuator is integrated into the frame of a pair of spectacles with arbitrary shaped contours. The reservoir is hidden inside the frame. An additional correction lens or protection glass helps to protect the membrane from accidental touch.

Figure 6:
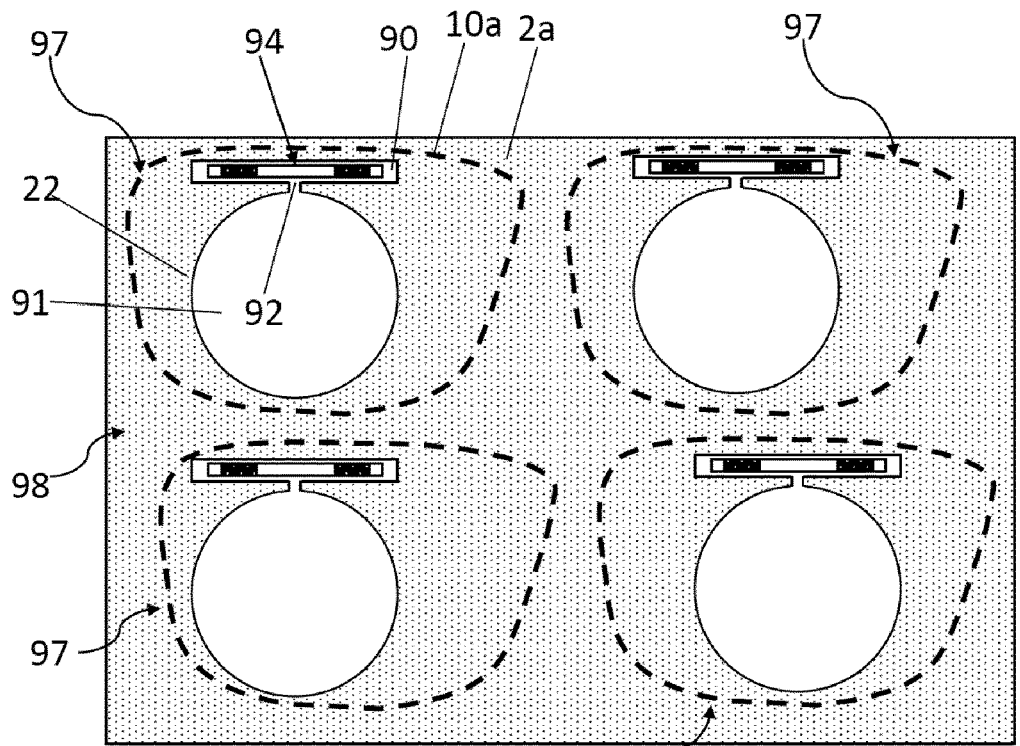

FIG. 6 shows how several tunable lenses can be fabricated in a batch process. The sealed liquid containers with integrated plunger can be prefabricated and afterwards carved out with the desired contour and position of the lens shaper in such a way that the clear aperture of the lens is aligned with respect to the lens contour and the desired pupillary distance.

Figure 7:
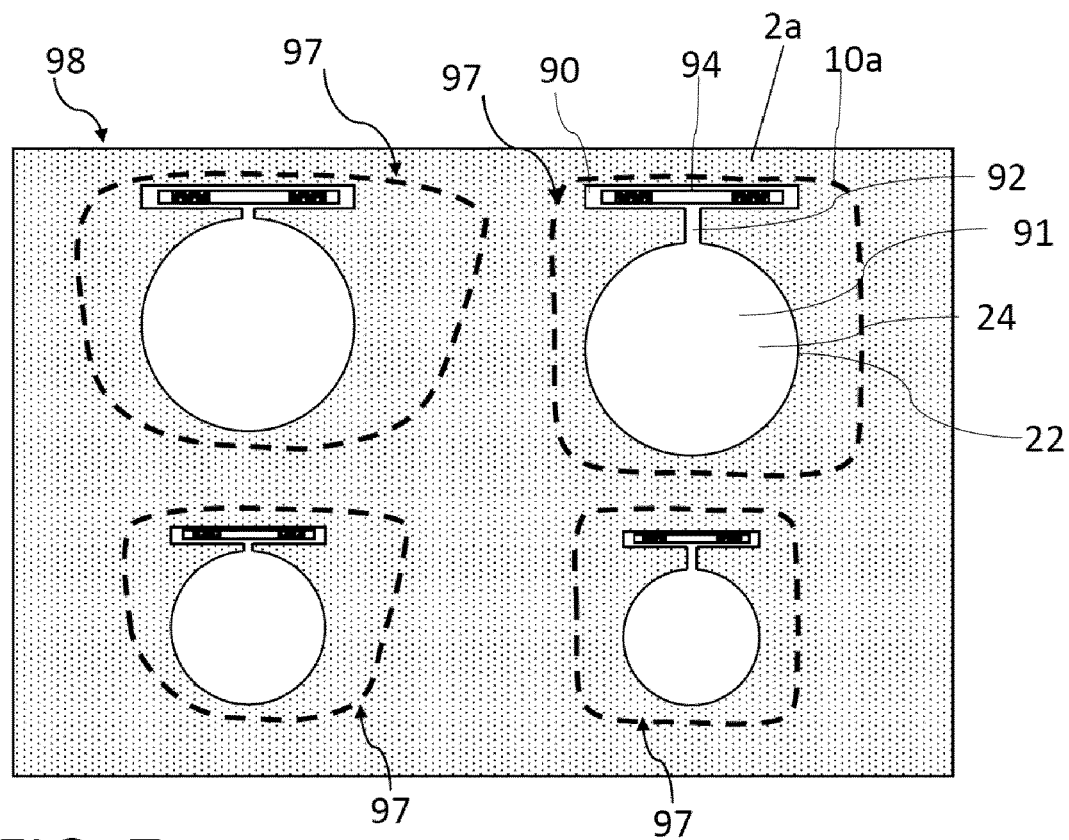

FIG. 7 illustrates the possibility to have a range of "templates" with different sizes of optical apertures as well as distances between the fluid reservoir and the optical aperture. This allows to accommodate different types of spectacle frame design and sizes.

Figure 8:
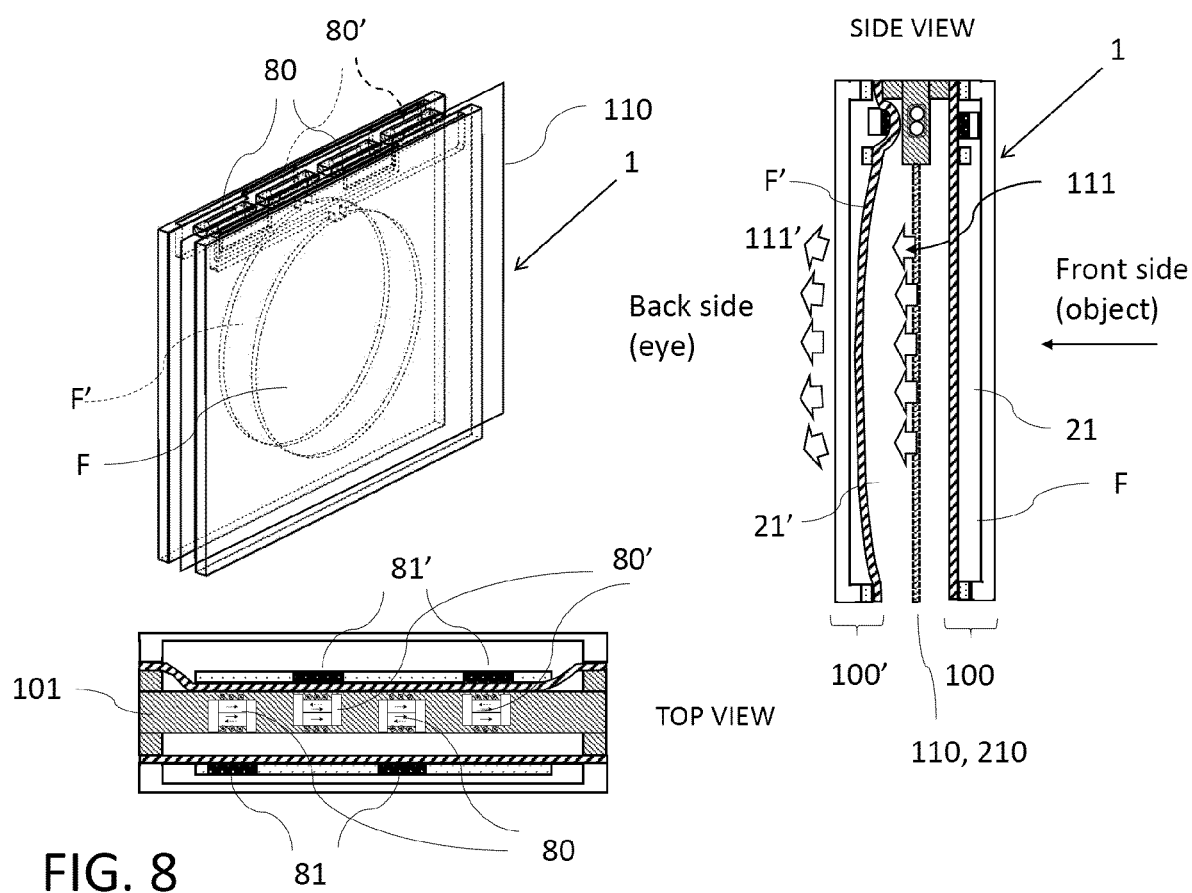

FIG. 8 shows a configuration suitable to solve the vergence-accommodation conflict in augmented reality glasses that are based on the waveguide approach. In this configuration 2 tunable lenses are placed in series and the image generating waveguide is sandwiched between the tunable lenses of opposite optical power.

Figure 9:
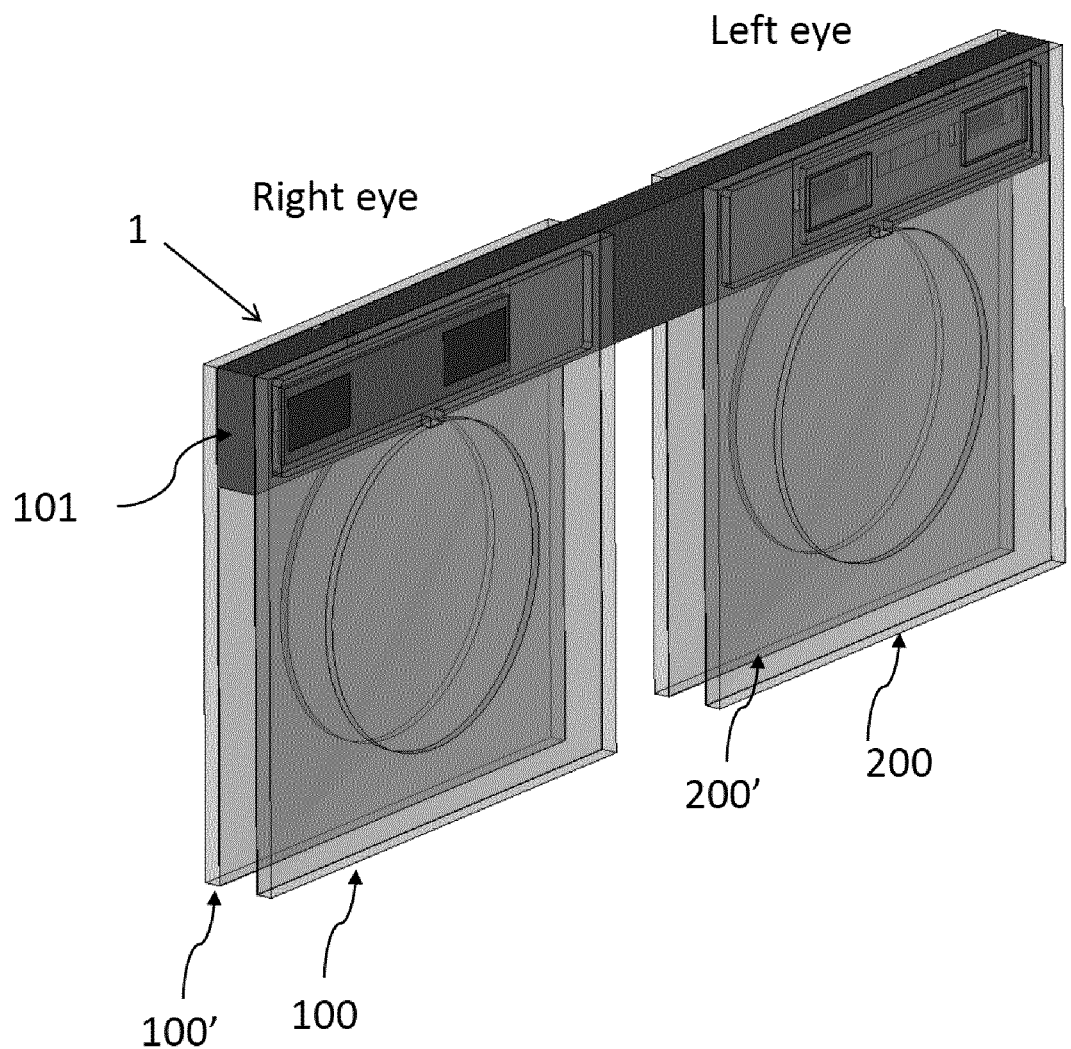

FIG. 9 shows the full 3D view of the augmented reality/mixed reality configuration with the various EPM motors for front lens/back lens and left eye/right eye integrated into a single bar. In this configuration the waveguide between front and back lens in not being displayed.

Figure 10:
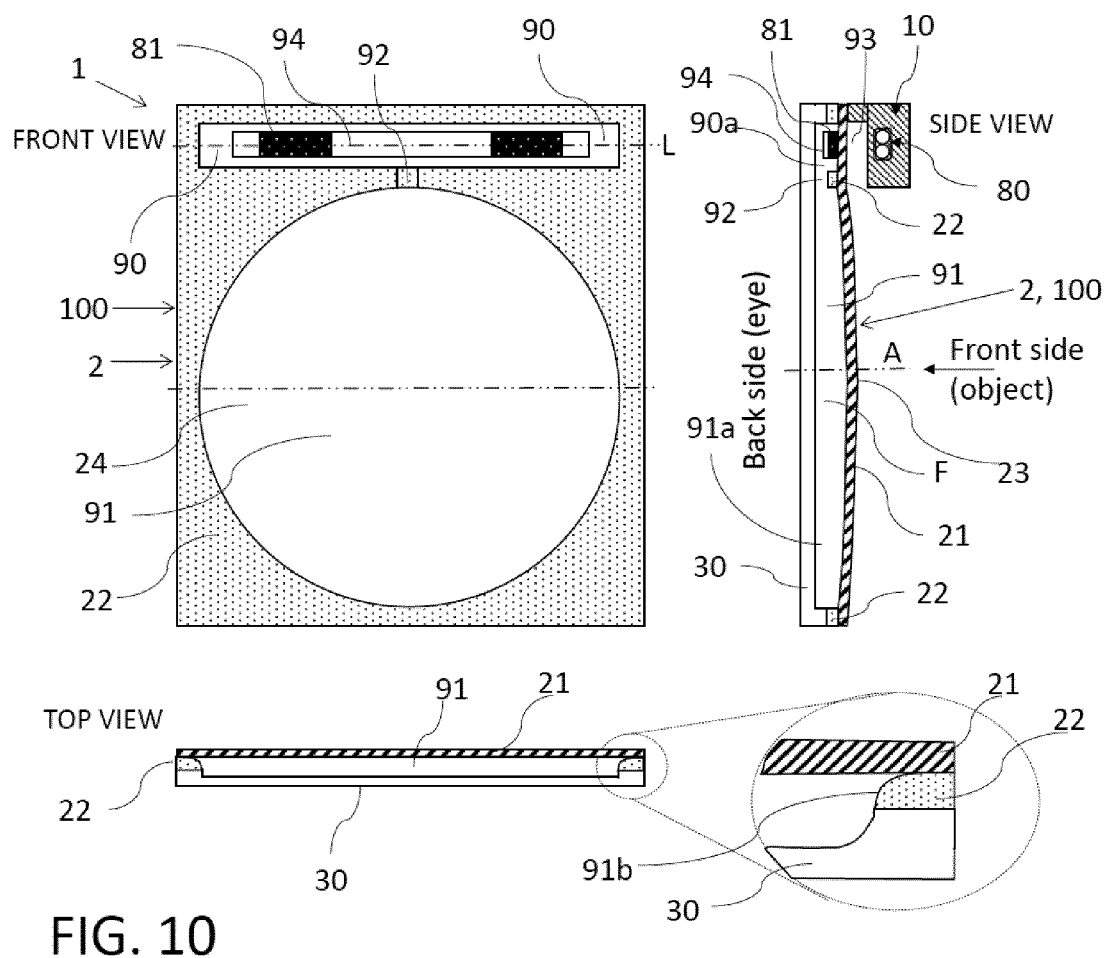

FIG. 10 shows a cross-section of further embodiment of an optical device according to the present invention comprising an electrically tunable lens based on a liquid filled reservoir that is connected through a liquid channel with a single reservoir. The liquid-filled reservoir as well as the actual lens area can be formed between membrane, lens shaper and back wall. A plunger containing of non-magnetic material having at least two inserts of soft magnetic material can be placed inside the liquid reservoir. On the other side of the membrane there can be at least two electro-permanent magnet (EPM) motors which are shown in the drawing in non-actuated state. Depending on the liquid fill level the membrane is deflected to the outside, i.e. convex state, in flat state or deflected to the inside, i.e. concave state. In this configuration the lens container can consist of two layers: an etched/embossed transparent material that is bonded to the lens shaper. In the displayed configuration the side walls that define the aperture can be rounded to avoid any light diffraction at sharp edges. The respective magnetic counter member can be formed by a permanent magnet.

Figure 1:
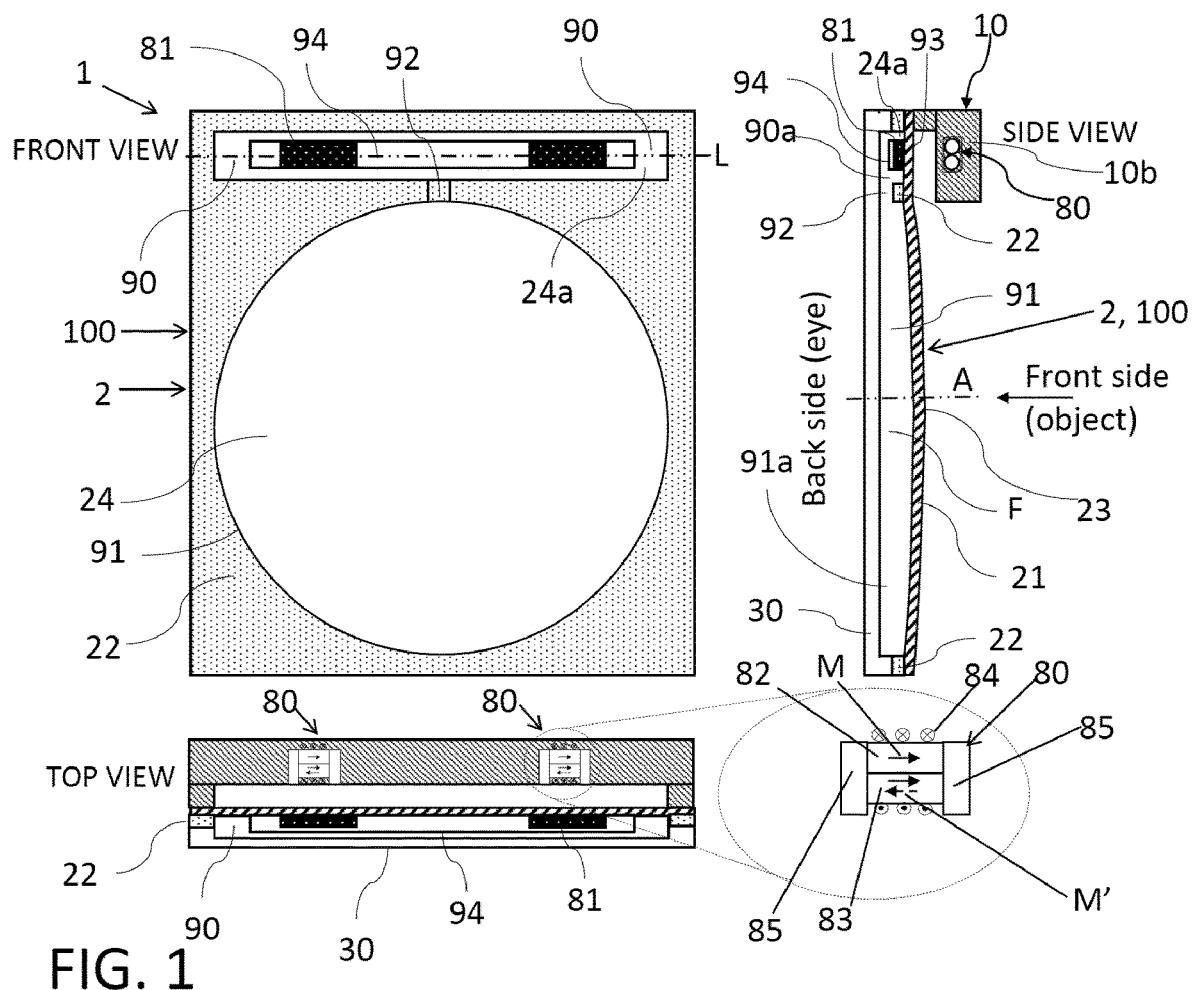
FIG. 1A shows the principle of an electropermanent magnet that can be used with the present invention.
FIG. 1B shows a variation of FIG. 1, but with multiple reservoir volumes, channels and electropermanent magnets.
Figure 11:
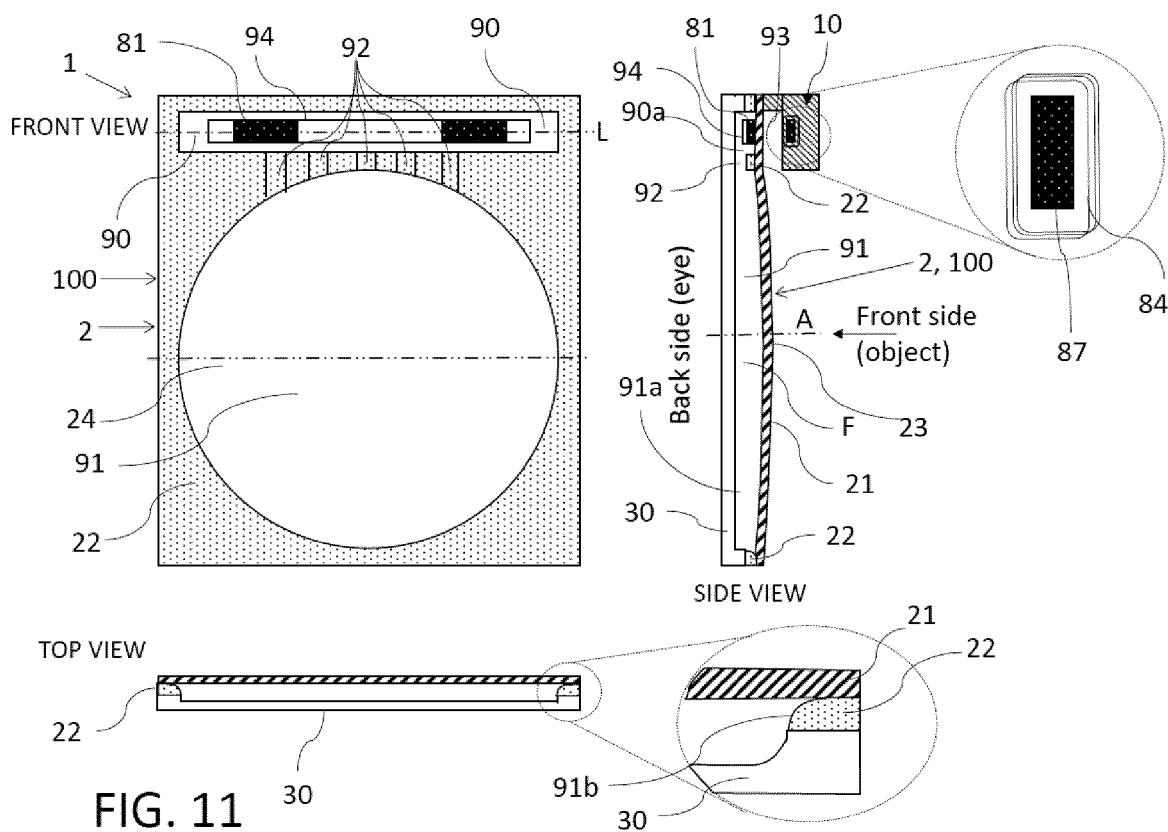

FIG. 11 shows a similar configuration as in FIG. 1 but with the liquid-filled reservoir volume being connected to the actual lens area/volume by multiple channels. As a modification, instead of an electropermanent magnet (EPM) motor the optical device comprises a coil wound around a soft magnetic material.

Figure 12:
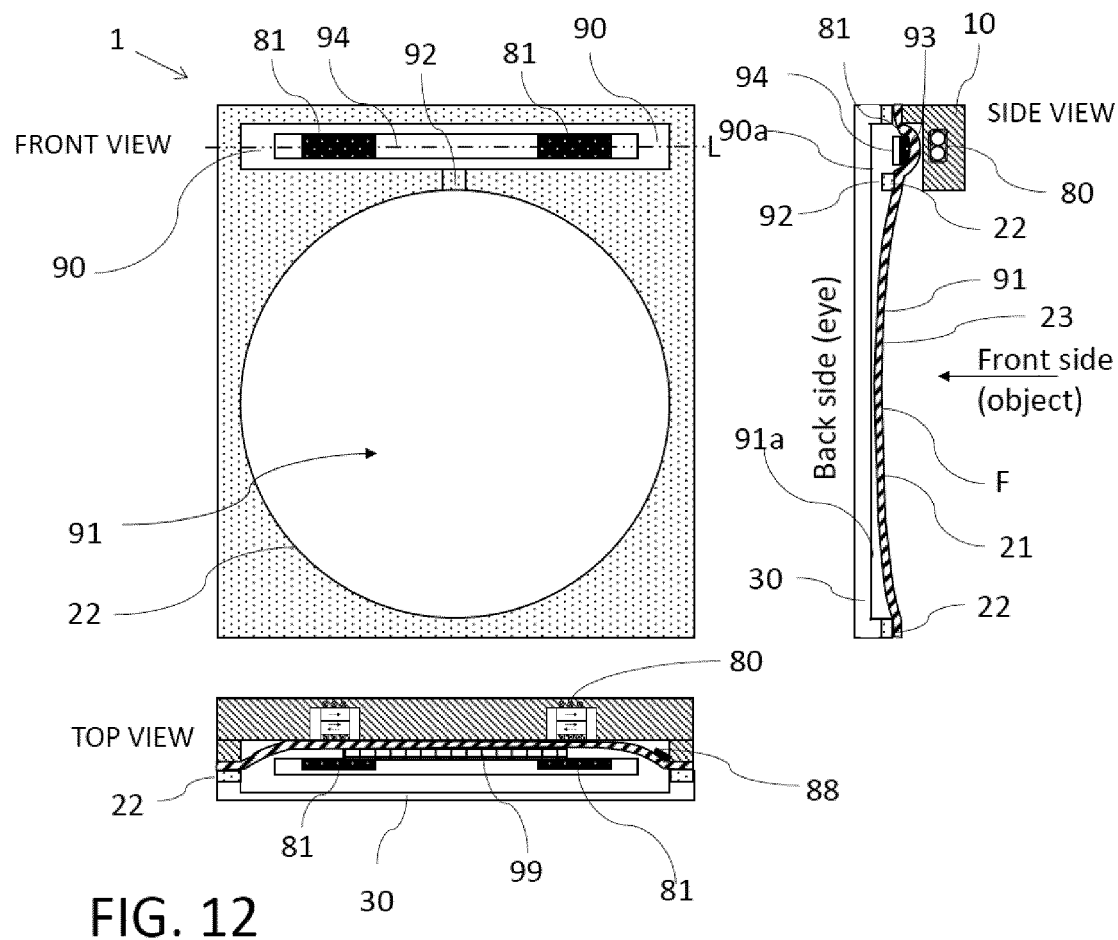

FIG. 12 shows a similar configuration as in FIG. 1 but with an additional spacer placed between the plunger and the membrane. Particularly, the spacer is smaller than the plunger thus making it easier to stretch the actuation membrane. A strain sensor can be placed on the actuation membrane to give a feedback on the position of the plunger and thus the tuning state of the lens.

Figure 13:
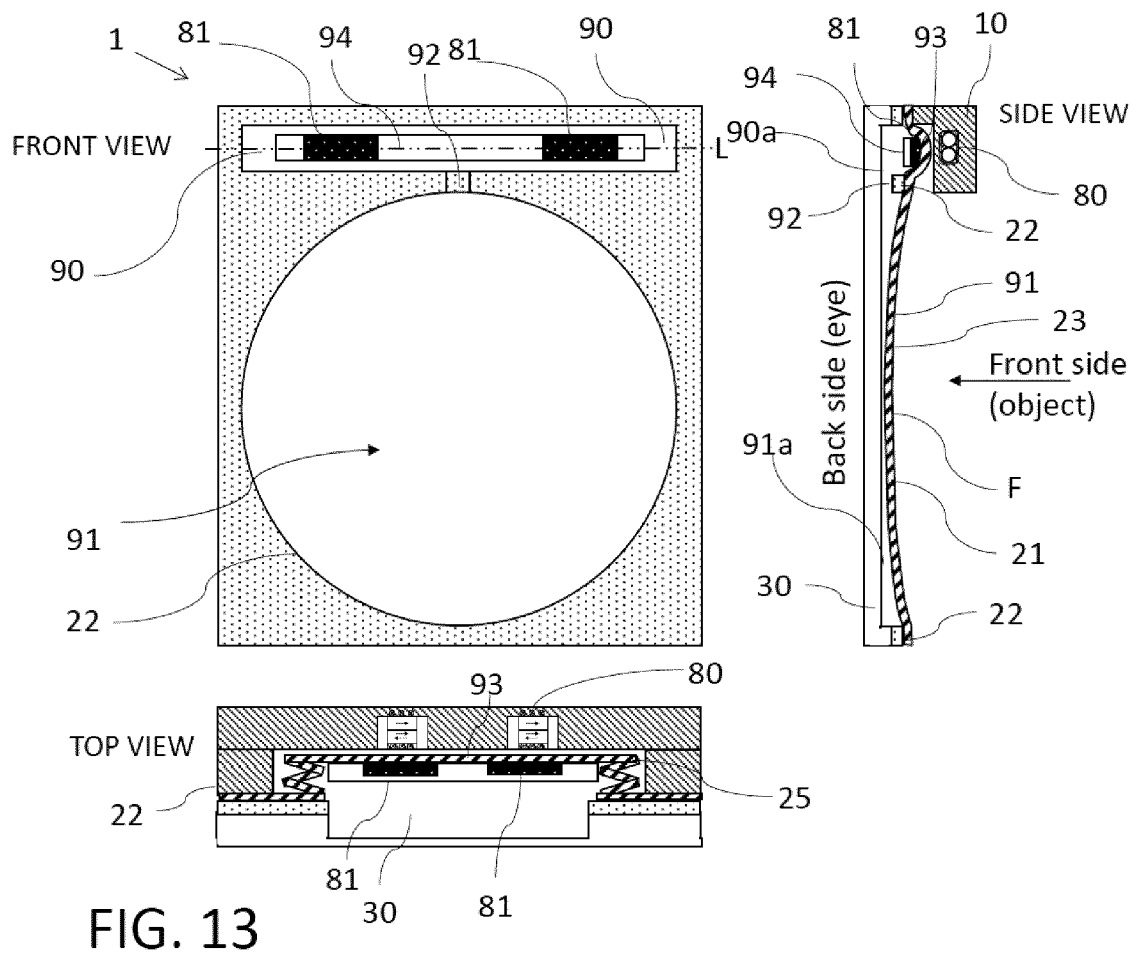

FIG. 13 shows a similar configuration as in FIG. 1 but with a below structure in inside the reservoir instead of a flat membrane.

Figure 14:
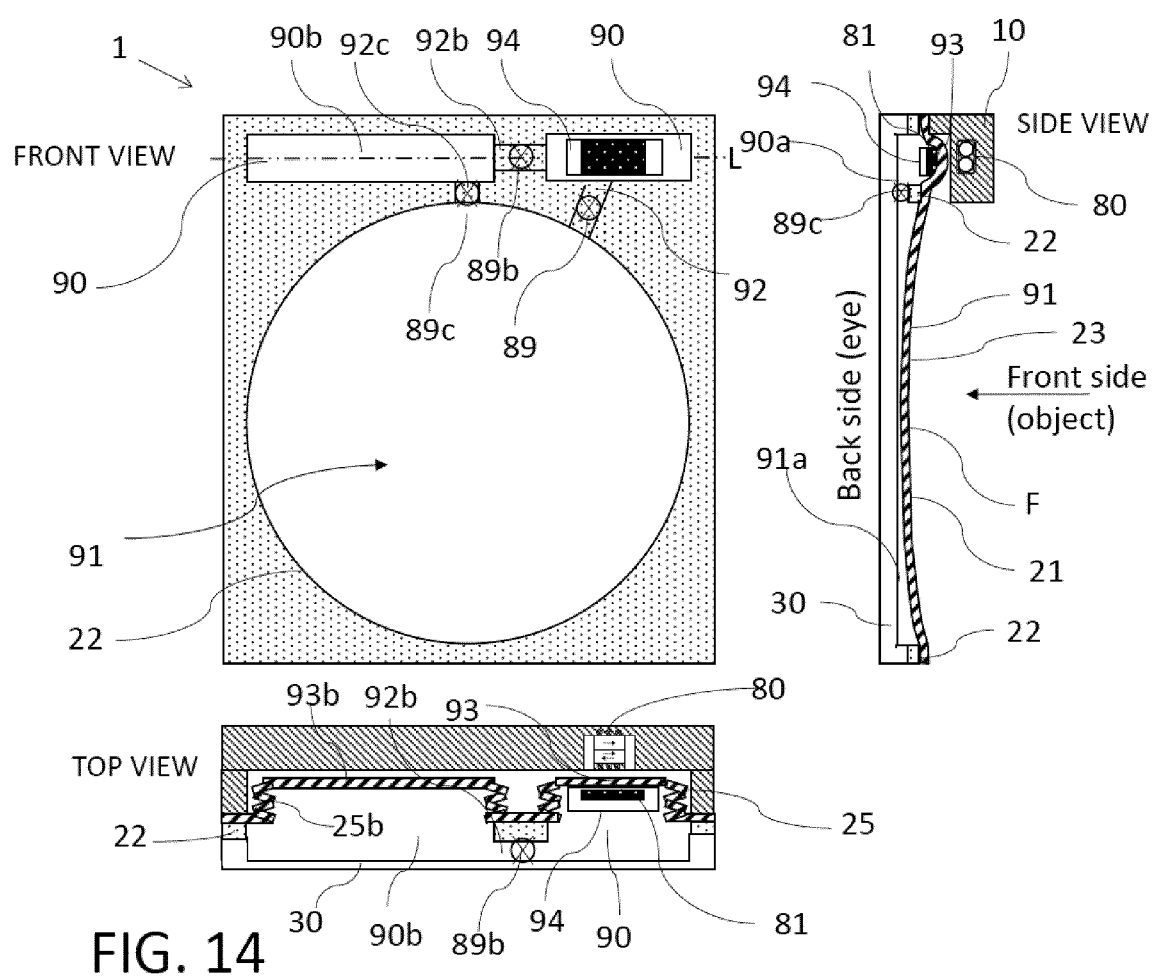

FIG. 14 shows a similar configuration as in FIG. 1 but with two reservoirs that are connected to the actual lens area/volume but also between each other. One reservoir represents a membrane pump that allows to pump liquid from the actual lens area to a liquid storage. This stored liquid can quickly be released by opening the valve between the pressurized reservoir and the actual lens area.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications, for example and not limited to virtual reality (VR) devices, augmented reality (AR) devices, mixed reality (XR) devices, progressive glasses, viewfinders.

It is noted that references in the specification to "one embodiment," "an embodiment, an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it would be within the knowledge of one skilled in the art to effect such feature, structure or characteristic in connection with other embodiments whether or not explicitly described.

Any embodiment involving an actuator has implicitly the possibility to adjust the left and the right eye simultaneously, once the base correction for each eye has been set.

The embodiment shown in FIG. 1 shows the cross-section of an optical device 1 comprising at least a first (e.g. electrically) tunable lens 100, based on a fluid (e.g. liquid) filled reservoir volume 90 that is connected through at least one channel 92 to a single lens volume 91. The liquid-filled reservoir volume 90 as well as the actual lens area/volume 91 are formed by a membrane 21, a lens shaper 22 and back wall (e.g. back glass) 30. While the main cavity (also denoted as lens volume) 91 is preferably circular or round in order to reduce optical aberrations, the at least one reservoir volume 90 has preferably an elongated non-round shape that may extend along a longitudinal axis L in order to hide inside a lens frame 10 containing an actuator component, here in form of at least one electropermanent magnet 80. Thus, the reservoir volume 90 is advantageously not visible from the outside when looking along the optical axis A onto the first lens 100.

Apart from the lens shaper 22, at least a portion of the main cavity 91, the (e.g. microfluidic) channel 92 and at least a portion of the reservoir volume 90 can be formed into the back wall 30 (e.g. in the form of corresponding recesses 91a, 92, 90a. In a specific embodiment the back wall 30 is made from a glass and the cavities/recesses 90a, 92, 91a are created by etching. In a different embodiment the back wall 30 is made from a highly transparent material that can be molded or embossed. A second optically transparent layer forms the lens shaper 22 and covers the channel 92. It is e.g. made from a material that hermetically seals the back wall 30 and the membrane 21 and that particularly provides a very smooth and flat surface in order not to create optical aberrations. In a preferred embodiment the lens shaper layer 22 is made from a thin slab of a glass. In a further preferred embodiment the thickness of this glass slab is less than 0.5 mm.

The fluid (e.g. liquid) F and the lens shaper 22 and the back wall material are preferably index-matched so that the channel 92 as well as the lens volume 91 are ideally non-visible. A plunger 94 that comprises e.g. two inserts of a soft magnetic material 81 that are e.g. inserted into a non-magnetic material of the plunger 94 is placed inside the reservoir volume 90. The two inserts 81 form counter members of associated electropermanent magnets 80 to be described below.

In a non-actuated state a curvature-adjustable area 23 of the membrane 21, which area 23 is defined by an (e.g. circular) opening 24 of the lens shaper 22 that is covered by the membrane 21 (particularly congruently by said area 23), is either flat or positively curved, based on the amount of fluid F inside the lens. In a particular embodiment a flexible, elastic membrane 21 (e.g. of a high optical transparency) is bonded onto the upper side of the lens shaper 22 (object side). The membrane 21 can be e.g. bonded either glue-free or with highly transparent colorless glue. For pumping fluid F from the reservoir volume 90 into the lens volume 91 and vice versa, the optical device 1 further comprises at least two electropermanent magnets (EPM) 80 that are arranged outside the at least one reservoir volume 90 in front of the membrane region 93 that covers the at least one reservoir volume 91, particularly a recess 24a formed into the lens shaper 22, wherein said EPMs 80 are aligned with said counter members 81 of the plunger 94 that is arranged in the reservoir volume and connected to the stretchable wall/membrane region 93 are. In comparison to other configurations this specific configuration minimizes the thickness of the optical device 1 by placing the plunger 94 with the magnetic material 81 inside the reservoir volume 90. When the EPM motors 80 are not actuated, the membrane 21, depending on the fluid (e.g. liquid) fill level, is either flat or positively deflected, i.e. in a convex state.

Figure 2:
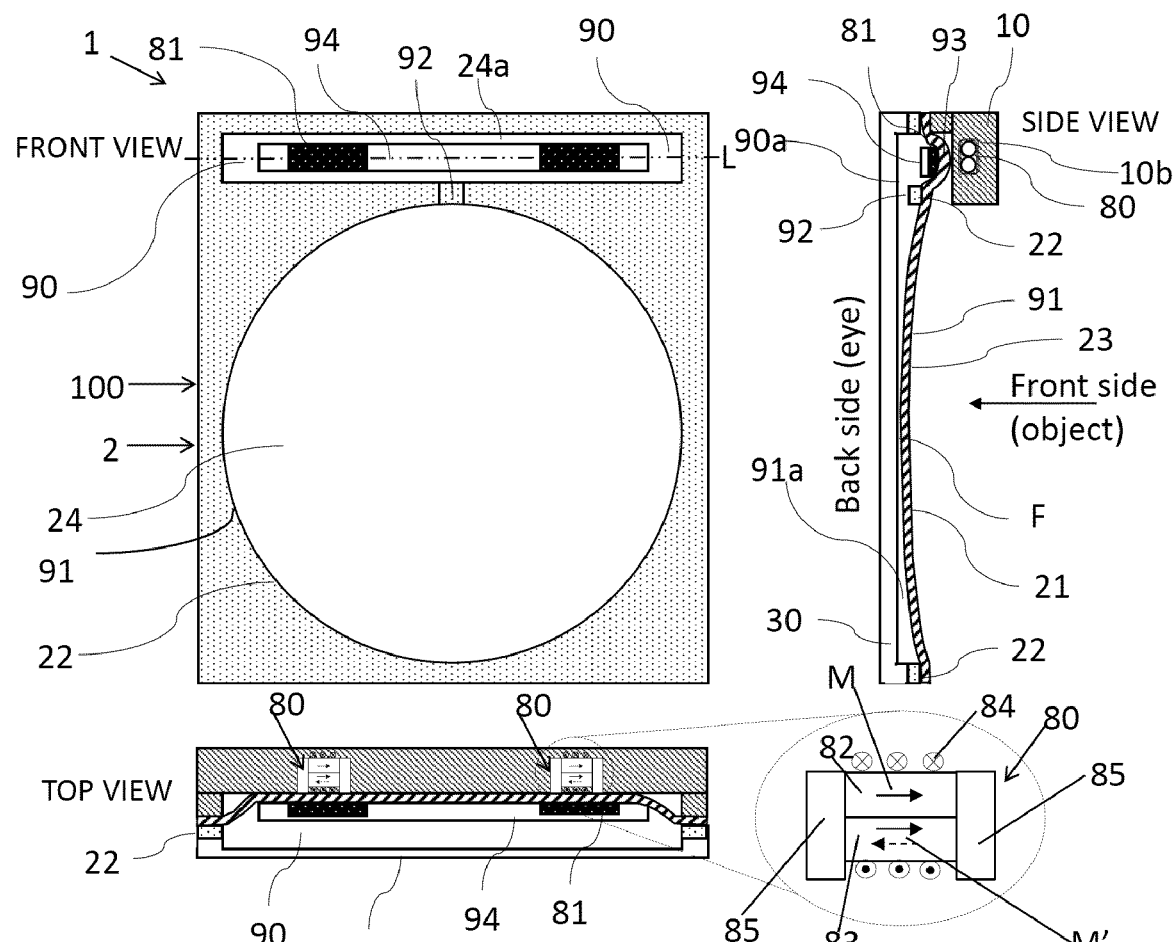
FIG. 2 shows the same configuration as in FIG. 1 but with the EPM motors in actuated state, i.e. the magnetic metal pieces are pulled towards the EPM motor and the membrane is deflected negatively, i.e. concave shape.

When the EPMs 80 are actuated as shown in FIG. 2 the magnetic counter members 81 that are connected to the stretchable wall 93, e.g. membrane region 93, of the reservoir volume 90 are pulled towards the respectively associated EPM 80. Thus, the reservoir volume 90 acts as a pump. The attractive force on the respective counter member 81 presses the stretchable wall 93 of the at least one reservoir volume upwards (the stretchable wall 93 is formed by a region 93 of the membrane 21 according to an embodiment), and consequently increases the effective volume inside the reservoir volume 90. The resulting under-pressure displaces fluid F from the lens volume (main cavity) 91 into the reservoir volume 90 and creates an under-pressure which curves said area 23 of the membrane 21 inwards.

The lens volume 91 and thus the curvature of the area 23 of the membrane 21 can be adjusted by controlling the effective reservoir volume 90.

By actuating all EPMs 80 symmetrically, the plunger 94 is pushed upwards symmetrically (i.e. without tilting the plunger 94). It is possible to actuate only a subset of all EPMs 80 in order to create an intermediate curvature between the minimum and maximum curvature. By driving the EPMs 80 in an analog fashion, an infinite number of states (and thus different curvatures of the area 23 and corresponding focal lengths of the first lens 100) can be created.

Figure 1A:
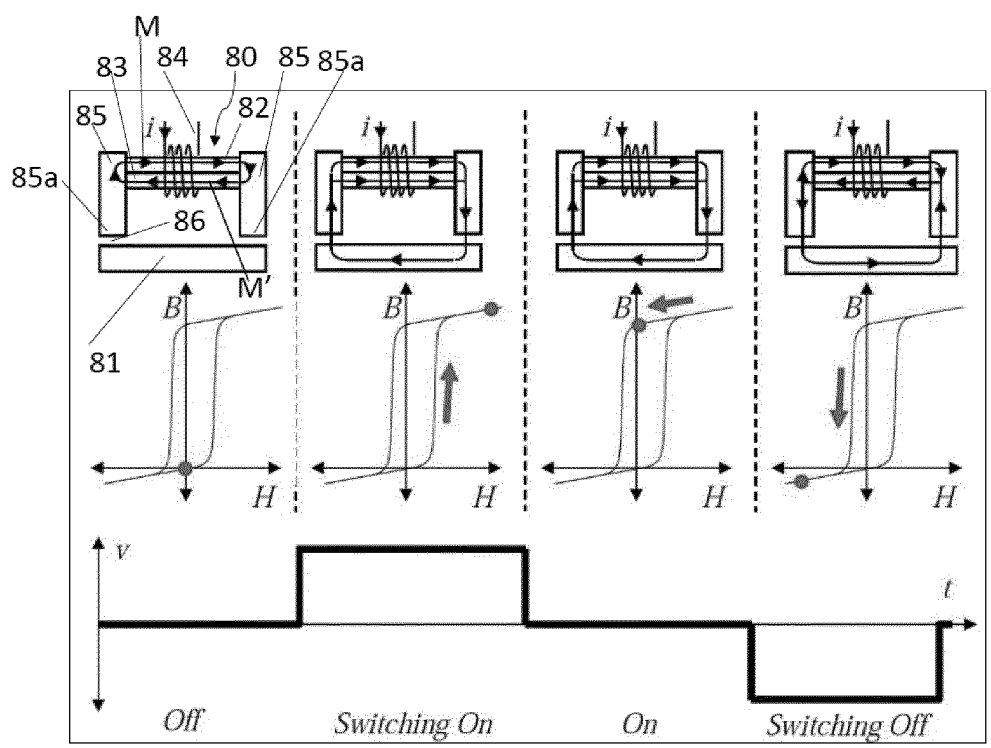

Particularly, the electropermanent magnets 80 can be formed and operated as shown in FIG. 1A. Generally, an electropermanent magnet (EPM) 80 is a type of a permanent magnet in which the external magnetic field can be switched on or off by a pulse of an electric current in coil (e.g. a wire winding) 84 as indicated in FIG. 1A.

The electropermanent magnet 80 consists of two sections or magnets 82, 83, namely a first magnet 82 (of a "hard"/high coercivity magnetic material) and a second magnet 83 (of a "soft"/low coercivity magnetic material). The direction of the magnetization M' of the latter piece 83 can be switched by a pulse of an electrical current in coil 84 surrounding the second magnet 83. When the magnetically soft and hard materials 82, 83 have opposing magnetizations M, M' the electropermanent magnet 80 produces no net external field across its poles, while when their direction of magnetization M, M' is aligned, the electropermanent magnet 80 produces an external magnetic field. Two pole members 85 consisting of soft magnetic material are located on both ends of the two permanent magnets 82, 83. Because the pole members 85 have a higher permeability than the air, they will concentrate the magnetic flux of the permanent magnets 82, 83. This electropermanent magnet 80 is mechanically connected to the back wall or back lens 30.

When the electropermanent magnet 80 is switched on and a counter member 81 of a soft magnetic material is placed in close proximity to the electropermanent magnet, the magnetic flux will flow confined in the soft magnetic material creating an attractive force. With the counter member 81 mechanically connected to the membrane above the reservoir volume, this attractive force increased the reservoir volume such that fluid F is transferred from the lens volume 91 into the reservoir volume. Due to this the stretchable curvature-adjustable area of the membrane 21 bulges less out and may even become flat or concave.

Particularly, as shown in FIG. 1, two electropermanent magnets 80 are arranged in the frame 10 of the optical device, wherein each electropermanent magnet 80 faces its associated counter member 81 that forms part of the plunger 94 connected to the membrane region 93 above reservoir volume 90. Particularly, each pole member 85 of the respective electropermanent magnet 80 comprises a face side 85*a* that faces the associated counter member 81 and forms a gap 86 with the associated counter member 81, When the respective electropermanent magnet 80 generates an external magnetic field, the respective counter member 81, and therefore the membrane region 93 covering the reservoir volume 90, is pulled towards the frame 10. This movement draws fluid F from the lens volume 91 into the (now increased) reservoir volume 90 and thus changes the curvature of the curvature-adjustable area 23 of the membrane 21 accordingly since fluid F is displaced away from the curvature-adjustable area 23 which then bulges less outwards accordingly. When the respective external magnetic field is turned off, the membrane region covering the reservoir volume 90 returns to its initial position and the curvature-adjustable area 23 of the membrane 22 returns to its initial position as well as fluid F is pressed back to the lens volume 91 via the channel 92.

This electropermanent magnet concept allows for fast diopter variations. A typical tuning speed can be in the order of 1 ms. Fast tuning is required in case the eyewear has built-in sensors that monitor the eye gaze distance with optical/electrical means.

Figure 1B:
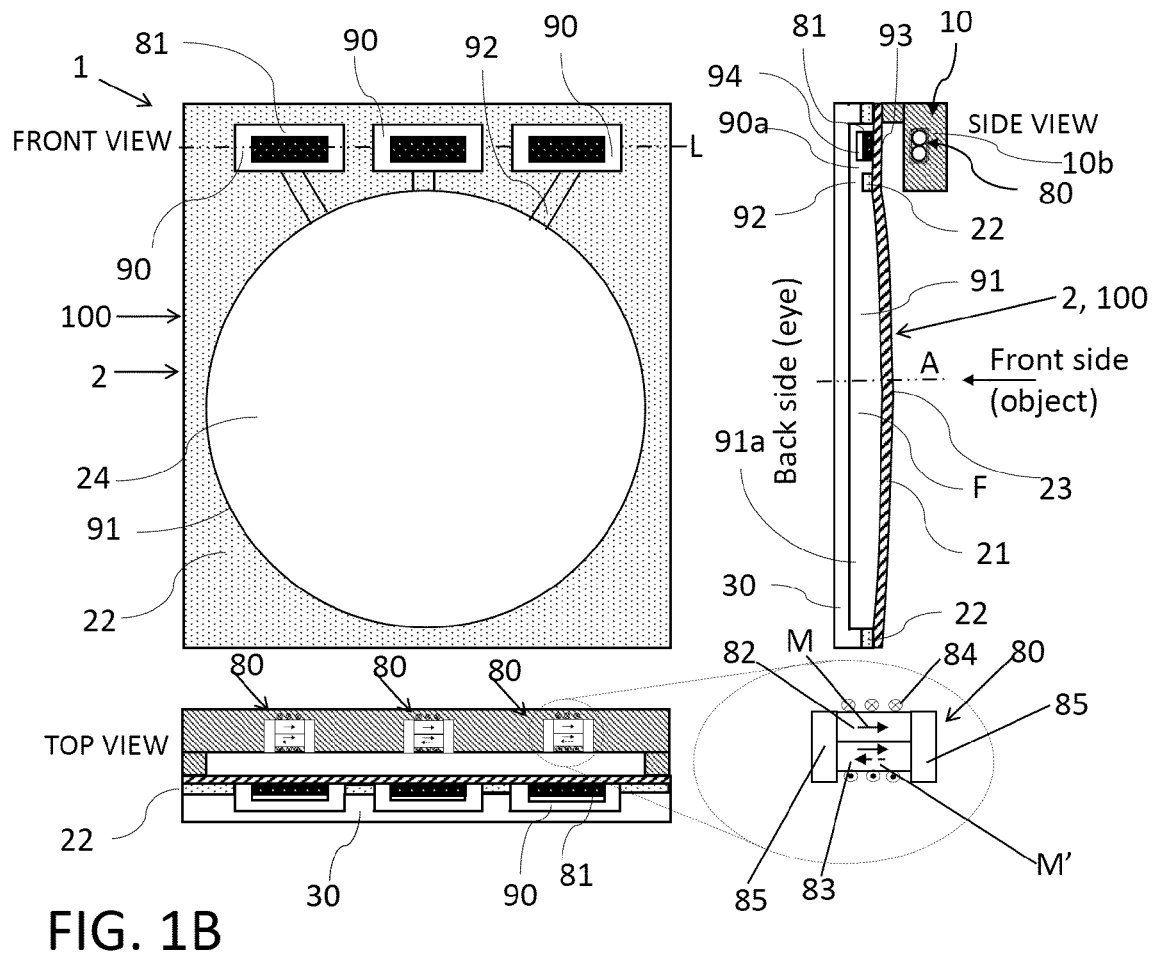

Furthermore, as shown in FIG. 1B, the optical device 1 may also comprise a plurality of reservoir volumes 90, wherein each reservoir volume 90 is in flow connection with the lens volume 91 via a separate channel 92. Furthermore, a plunger comprising a magnetic flux guiding counter member 81 (or formed by a magnetic flux guiding counter member 81), is arranged in each reservoir volume 90 and connected to a stretchable wall 93 of the respective reservoir volume 90. Particularly, each stretchable wall 93 can be formed again by a region of the membrane 21 that also covers the lens volume (main cavity) 91.

Further, each counter member 81 faces an associated electropermanent magnet that is preferably embedded in said frame 10 for holding the container 2, which frame 10 is arranged in front of the reservoir volumes 90 so as to cover them.

Here, particularly, the optical device 1 is configured to control each electropermanent magnet 80 independently from the other electropermanent magnets 80. This allows the optical device 1 to generate a plurality of different curvatures of the said curvature-adjustable area 23 of the membrane 21 (and therewith a plurality of corresponding focal lengths of the first lens 100) even in case the respective electropermanent magnet merely moves the associated counter member 81 between two stable states corresponding to a convex state of the respective stretchable wall (membrane region) 93, in which the respective counter member 81 is closest to the associated electropermanent magnet 80 and in which the respective reservoir volume 90 has maximal size, and a flat state (shown in FIG. 1B) of the respective stretchable wall/membrane region 93 corresponding to a smaller volume value of the respective reservoir volume 90. Particularly, the reservoir volumes 90 can have different volume values (e.g. with respect to said flat state of the respective reservoir volume 90) so as to increase the number of different focal lengths that can be selected/adjusted by the optical device 1 when actuating each reservoir volume 90 independently.

Figure 3:
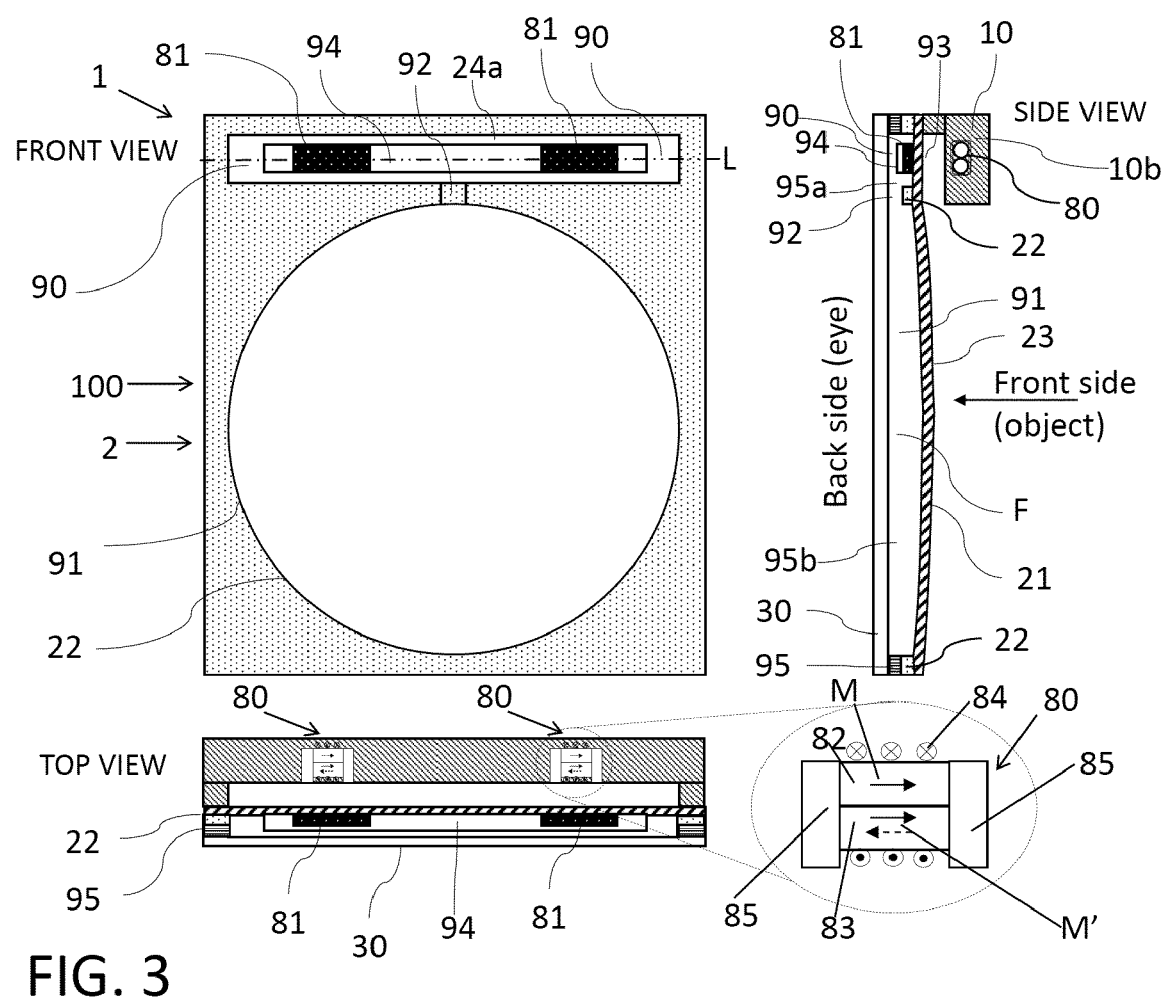
FIG. 3 shows a similar configuration as in FIG. 1 but with the lens container consisting of three layers: a bottom glass, an intermediate layer and the lens shaper.

FIG. 3 shows a variation of FIG. 1 where the respective main portion of the fluid cavity/lens volume 91 and the reservoir volume 90 are not embossed into the back wall 30 as described above but are formed by an intermediate layer 95 that comprises recesses 95*a*, 95*b* for forming at least a portion of the reservoir volume 90 and of the lens volume 91, wherein a further recess 92 forms said channel connecting the reservoir volume 90 to the lens volume 91. Particularly, said intermediary layer 95 is bonded both to the back wall 30 and to the lens shaper 22, wherein the intermediate layer 95 acts as a spacer that defines portions of the reservoir volume 90, the main cavity (lens volume) 91, and the channel 92. This configuration has certain advantages concerning fabrication since the different layers 30, 95, 22 can be cut out from sheets as 2-dimensional shapes. In one specific embodiment both the back wall 30 and the lens shaper 22 are made from a glass and the intermediate layer 95 is made out of a silicone-based polymer such as poly(dimethylsiloxane), also known as PDMS, or a polyester material such as PET or a biaxially-oriented polyethylene terephtalate (e.g. "Mylar"). In a different embodiment, the back wall 30, intermediate layer 95 and lens shaper 22 are all made from glass layers that are bonded together by means of a glass-glass bonding process.

In yet another embodiment the back wall, intermediate layer and lens shaper are formed inside a monolythical block of photo-structurable glass. A femto-second laser locally changes the glass structure. In a subsequent etching process the exposed material is selectively etched away. Such a process would allow to create a fluid channel 22 that is completely embedded in a material (e.g. glass).

Figure 4:
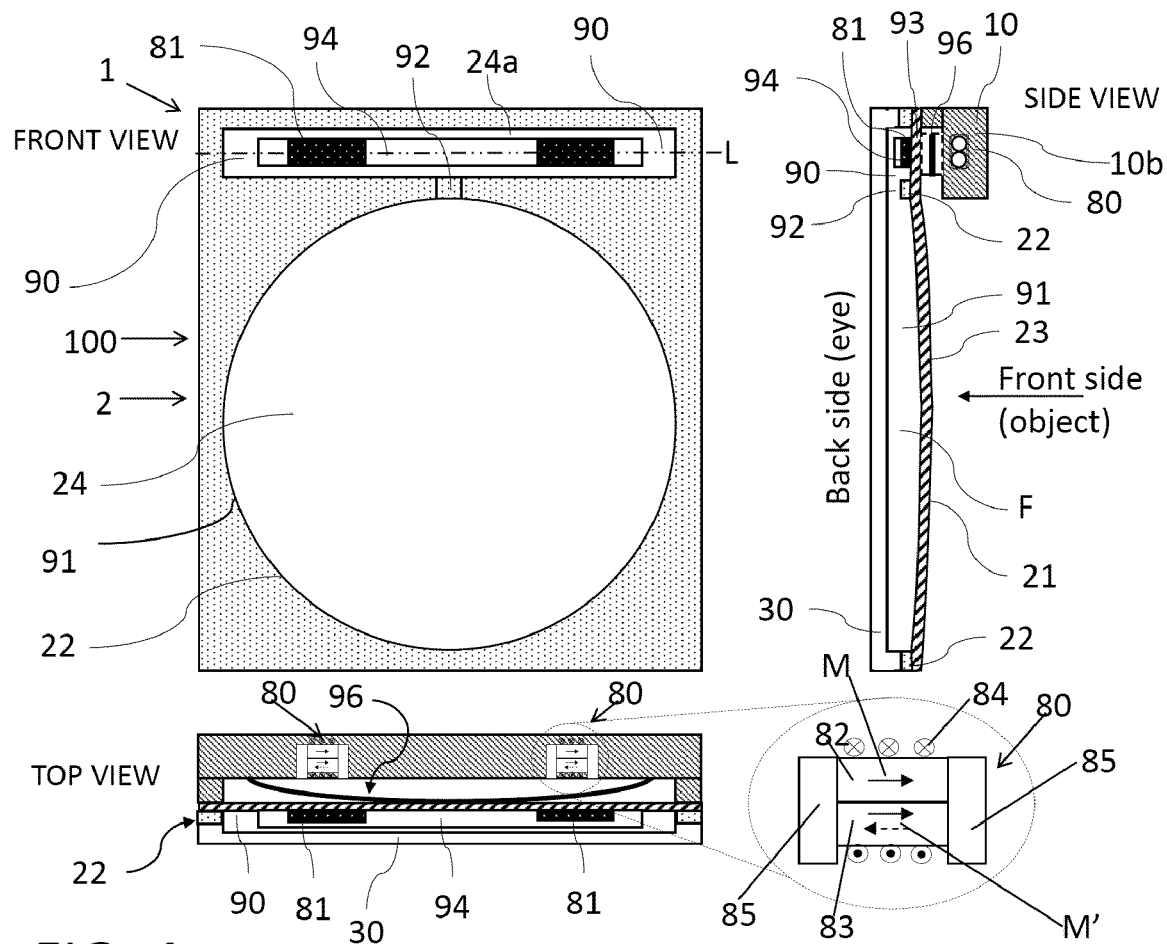
FIG. 4 shows a similar configuration as in FIG. 1 but with an additional spring structure made from non-magnetic material placed between the plunger and the EPM motors. It helps the lens to go quicker back to the nominal position.

The embodiments depicted in FIGS. 1 to 3 rely on the force of the EPM actuator(s) 80 to bring the membrane 21 into negative curvature and rely on the elastic force of the membrane 21 as a restoring force to bring the membrane 21, particularly area 23, back to a positive shape. In order to increase the dynamic of bringing the lens back to positive shape when the EPM 80 is turned off, an additional mechanical spring 96 can be arranged between the EPMs 80 and the magnetic counter members 81 as depicted in FIG. 4. Particularly, the spring 96 is made out of a non-magnetic material in order to avoid interference with the functioning of the EPM 80. In a specific embodiment the spring 96 can be a bent sheet metal spring. However, any element that generates a restoring force upon mechanical compression can be used as spring structure 96. This also includes having multiple springs, non-metallic springs, elastomer elements etc.

FIG. 5 shows how the previously described first lens 100 can be integrated into a frame 10 of spectacles. The reservoir volume 90 can be hidden inside an upper part of the spectacle's frame 10. The lens contour 10*a* can be adjusted to the shape of the frame 10. The container 2 including back wall (e.g. back glass or back lens) 30, lens shaper 22, and membrane 21 can be pre-fabricated and filled with fluid F. The EPMs 80 and the required driving electronics can be integrated into the frame 10 of the spectacles. The battery can be integrated into the frame 10 or into one or both of the spectacles earpieces. Having those earpieces exchangeable allows for a reserve charge in case battery levels get low during use.

Further, the membrane 21 can be mechanically protected by a front wall (e.g. front glass or front lens) 40. Both front wall 40 and back wall 30 can include a spherical offset for myopia and hyperopia correction as well as provide correction of higher order aberrations such as astigmatism and gravity coma. In FIG. 5, for simplicity, no actuation is shown. In a specific embodiment both back wall 30 and front wall 40 can be formed by a flat glass, respectively.

FIG. 6 shows how several tunable lenses can be fabricated in a batch process using a substrate 98 that contains several tunable lens elements 97. The sealed containers 2 with integrated plunger 94 can be prefabricated and afterwards carved out with the desired contour 10a and position of the lens shaper 22 in such a way that the lens shaper 22 is aligned with respect to the lens contour and provides a specific pupillary distance.

FIG. 7 illustrates the possibility to have a range of tunable lens "templates" 97 with different sizes of optical apertures as well as distances between the reservoir volume 90 and the opening 24 of the lens shaper 22. This allows to accommodate different types of spectacle frame design and sizes.

In augmented reality (AR) or mixed reality applications waveguides are used to provide the user the illusion of an object located at a given distance from the eye. This can be achieved by coupling the projected image into a waveguide and coupling it out of the waveguide within the field-of view of the user. This sort of leaky waveguide has the advantage that the image is insensitive to the movement of the pupil and generally to misalignments. In other words waveguides provide a larger eye box.

While most AR systems use a fixed so called light-field image plane, it has proven to be problematic in terms of vergence. While different images provided to the left and to the right eye provide stereoscopic vision and thus the possibility to provide images at different image plans, the light physically originates always with the same divergence. The mismatch between the suggested light field plane and actual divergence of the light is well known as vergence-accommodation conflict and is responsible for example nausea and similar symptoms.

FIG. 8 shows a configuration with a first lens 100 followed by a waveguide 110 and a further first lens 100' (such a configuration can e.g. be used for a single eye of a user). The waveguide as well as the two lenses 100, 100' are transparent and allow the user to view its surrounding with an unobstructed field-of-view (FOV).

A light-field image is coupled into the waveguide 110 as known by somebody skilled in the art. The waveguide structure guides the light through total internal reflection and contains special out-coupling structures on the side towards the observer's eye where the light 111 is coupled out close to a collimated beam. It traverses then the further first lens 100' after which a collimated or diverging light beam 111' exits which is subsequently refocused inside the user's eye to form an image on the retina from an object placed at a given virtual distance. Depending on the curvature of the membrane 21' the light-field image appears closer or further away from the user's eye.

The light coming from the surrounding needs to traverse both first lenses 100 and 100' and the waveguide. In order for the user to see the surrounding without any refraction correction, the two lenses 100, 100' need to compensate each other out. The refractive power of first lens 100 and further first lens 100' are electrically adjusted in such a way to have the same refractive power but with opposite sign, i.e. the membranes 21 and 21' have opposite deflection.

FIG. 8 shows that the EPMs 80 for both first lens 100 and further first lens 100' are arranged all in the same common bar structure 101 in order to provide the most compact possible design. The minimum number of EPMs 80 per eye is 4. In a specific embodiment the number is a multiple of two. For simplicity four EPMs 80 are depicted. The first lens 100 has magnetic counter members 81 in front of its associated two EPMs 80. The further first lens 100' also has magnetic counter members 81 in front of its two associated EPMs 80'. Thus, the counter members 81, 81 of both lenses are arranged offset.

Particularly, for this application, the fill-level of the respective lens 100, 100' is chosen such that the respective membrane 21, 21' is flat in its unactuated nominal position.

In a first situation a positive current pulse is sent to the EPMs 80 associated to the first lens 100 resulting in a negative curved first lens 100. The further first lens 100' is in its nominal flat position. This corresponds to the situation where the light-field is placed at infinity since the user's eye does not need to focus to see the virtual image. In a second situation a negative current pulse is sent to the EPMs 80 associated to the first lens 100 resulting in a zero magnetic force putting the first lens 100 back to its nominal flat position. Simultaneously, a positive pulse is sent to the EPMs 80 associated to the further first lens 100' resulting in a negative curved further first lens 100'. This corresponds to the situation where the light-field is placed at a close distance since the eye needs to accommodate to short distance to create an image on the retina due to the incoming diverging beam. When switching from the first situation to the second situation the position of the light-field has shifted while the overall lens stack always keeps the same overall refracting power.

As mentioned previously the EPMs 80 can be controlled in an analog way by not fully magnetizing/demagnetizing the respective EPM 80 and thus arbitrary deflections of the respective membrane 21, 21' within the possible deflection range can be achieved. This allows not only to produce the two extreme positions of the light field, but also all intermediate positions.

In a different embodiment the same configuration can be used to correct for small refractive errors of the users eye by adding a small offset to the first lens 100.

FIG. 9 shows the full 3D view of the augmented reality/mixed reality configuration with the various EPM motors for front lens/back lens and left eye/right eye integrated into a single bar 101 or frame 101. In this configuration, the waveguides 110, 210 between front and back lenses 100, 100' (right), or 200, 200' (left) are not being displayed. Particularly here, the first lens 100 and further first lens 100' are associated to the right eye, while for the left eye a second lens 200 and a further second lens 200' are provided. Particularly, the second lens is designed like the first lens 100 and the further second lens 200' is designed like the further second lens. Further, the further waveguide 210 is positioned between the second and the further second lens 200, 200' as described for the waveguide 110 in conjunction with the first lenses 100, 100.

The embodiment shown in FIG. 10 corresponds to a modification of the embodiment shown in FIG. 1. Particularly, FIG. 10 shows the cross-section of an optical device 1 comprising at least a first (e.g. electrically) tunable lens 100, based on a fluid F (e.g. liquid) filled reservoir volume 90 that is connected through at least one channel 92 to a single lens volume 91. The liquid-filled reservoir volume 90 as well as the actual lens area/volume 91 are formed by a membrane 21, a lens shaper 22 and back wall (e.g. back glass) 30. While the main cavity (also denoted as lens volume) 91 is preferably circular or round in order to reduce optical aberrations, the at least one reservoir volume 90 has preferably an elongated non-round shape that may extend along a longitudinal axis L in order to hide inside a lens frame 10 containing an actuator component, here in form of at least one electropermanent magnet 80. Thus, the reservoir volume 90 is advantageously not visible from the outside when looking along the optical axis A onto the first lens 100.

Apart from the lens shaper 22, at least a portion of the main cavity 91, the (e.g. microfluidic) channel 92 and at least a portion of the reservoir volume 90 can be formed into the back wall 30 (e.g. in the form of corresponding recesses 91a, 92, 90a. In a specific embodiment the back wall 30 is made from a glass and the cavities/recesses 90a, 92, 91a are created by etching. In a different embodiment the back wall 30 is made from a highly transparent material that can be molded or embossed. A second optically transparent layer forms the lens shaper 22 and covers the channel 92. It is e.g. made from a material that hermetically seals the back wall 30 and the membrane 21 and that particularly provides a very smooth and flat surface in order not to create optical aberrations. In a preferred embodiment the lens shaper layer 22 is made from a thin slab of a glass. In a further preferred embodiment the thickness of this glass slab is less than 0.5 mm.

The fluid (e.g. liquid) F and the lens shaper 22 and the back wall material are preferably index-matched so that the channel 92 as well as the lens volume 91 are ideally non-visible. A plunger 94 that comprises e.g. two inserts of a soft magnetic material 81 that are e.g. inserted into a non-magnetic material of the plunger 94 is placed inside the reservoir volume 90. The two inserts 81 form counter members of associated electropermanent magnets 80 to be described below.

In a non-actuated state a curvature-adjustable area 23 of the membrane 21, which area 23 is defined by an (e.g. circular) opening 24 of the lens shaper 22 that is covered by the membrane 21 (particularly congruently by said area 23), is either flat or positively curved, based on the amount of fluid F inside the lens. In a particular embodiment a flexible, elastic membrane 21 (e.g. of a high optical transparency) is bonded onto the upper side of the lens shaper 22 (object side). The membrane 21 can be e.g. bonded either glue-free or with highly transparent colorless glue. For pumping fluid F from the reservoir volume 90 into the lens volume 91 and vice versa, the optical device 1 further comprises at least two electropermanent magnets (EPM) 80 that are arranged outside the at least one reservoir volume 90 in front of the membrane region 93 that covers the at least one reservoir volume 91, wherein said EPMs 80 are aligned with said counter members 81 of the plunger 94 that is arranged in the reservoir volume and connected to the stretchable wall/membrane region 93 are. In comparison to other configurations this specific configuration minimizes the thickness of the optical device 1 by placing the plunger 94 with the magnetic material 81 inside the reservoir volume 90. When the EPM motors 80 are not actuated, the membrane 21, depending on the fluid (e.g. liquid) fill level, is either flat or positively deflected, i.e. in a convex state.

Furthermore, the container 2 comprises a circumferential lateral inner side 91b forming a side wall of the lens volume 91, wherein said lateral inner side 91b that defines the aperture of the lens 100 of the optical device is rounded instead of extending simply vertical, i.e. perpendicular to the back wall 30. The rounded shape prevents light diffraction at sharp edges. In the event of a non-perfect index matching, the rounded shape leads to an optical gradient and makes the edge completely invisible. The rounding can be in the back wall 30, in the lens shaper 22 or in both. Particularly, the back wall 30 can comprise a concave curvature at the inner side 91b and the lens shaper 22 can comprise a convex curvature at the inner side 91b, such that particularly said inner side comprises an inflection point.

In a preferred embodiment the fluid F and the immersed lens shaper 22 have the same Abbe number, thus the same dispersion properties.

Furthermore, according to an embodiment the fluid F has a low viscosity to increase the flow rate through the channel 92 and thus the switching speed of the lens 100. Also, in an embodiment, the fluid F and the lens shaper 22 comprise a high-refractive index to reduce the amount of fluid F that has to be displaced for a given focus change. This allows larger clear apertures, larger optical power ranges and lower switching times. According to a preferred embodiment, the refractive index of the fluid F and/or of the lens shaper 22 is larger than 1.45, preferably larger than 1.55.

Furthermore, while in the embodiment shown in FIG. 1, the respective counter member 81 is formed out of a soft magnetic material 81, the magnetic counter members 81 according to the embodiment shown in FIG. 10 are replaced by permanent magnets 81 that are used in conjunction with the respective EPM 80.

This allows to operate the lens in push-pull and close to double the optical power tuning range of the lens.

Furthermore, FIG. 11 shows a further embodiment of an optical device 1 according to the present invention which is a modification of the embodiment shown in FIG. 10. The tuning speed is directly related to the flow resistance in the channel 92. A larger channel provides lower flow resistance and thus potentially higher speed. In a preferred embodiment there are multiple channels 92 connecting the reservoir volume 90 with the main lens area (i.e. the lens volume 91) instead of a single large channel to provide better mechanical stability.

In the depicted embodiment, the electropermanent magnet 80 that typically consists of two sections or magnets, namely said first magnet (of a "hard"/high coercivity magnetic material) 82 and said second magnet 83 (of a "soft"/low coercivity magnetic material) now comprises a single member 87 of "soft"/low coercivity magnetic material. The direction of the magnetization M of the latter piece can be switched by a pulse of an electrical current in coil 84 surrounding the single magnet 87. Also here, two pole members 85 consisting of soft magnetic material can be located on both ends of the single magnet 87. Because the pole members 85 have a higher permeability than the air, they will concentrate the magnetic flux of the single magnet 87. Particularly, this electropermanent magnet 80 is mechanically connected to the back wall or back lens 30.

When the member 87 is magnetized and a counter member 81 of a soft magnetic material (or a permanent magnet) is placed near member 87, the magnetic flux will flow confined in the soft magnetic material creating an attractive force. With the counter member 81 mechanically connected to the membrane/wall 93 above the reservoir volume 90, this attractive force increases the reservoir volume 90 such that fluid F is transferred from the lens volume 91 into the reservoir volume 90. Due to this the stretchable curvature-adjustable area 23 of the membrane 21 bulges less out and may even become flat or concave.

While the EPM 80 using the two magnet 82, 83 has the advantage that switching to zero state is easier, the above described actuator version still can achieve neutral position (no magnetization) by applying the correct electrical current pulse to the single magnet 87 by means of the surrounding coil 84. Furthermore, it is easier to manufacture and offers the same functionality.

Furthermore, FIG. 12 shows an embodiment of an optical device 1 according to the present invention which is a modification of the embodiment shown in FIG. 10. Particularly, the difference is that there is a mechanical spacer 99 between the plunger 94 and the membrane 21 which is smaller than a surface of the plunger 94 facing the membrane 21. As such the free-moving non-bonded membrane area is increased, the mechanical stress in the actuator membrane 21 is reduced. In consequence the actuation force is reduced, thus reducing the required switching power or potentially allowing for larger clear apertures.

This embodiment furthermore includes a sensor 88 that measures the curvature or the strain in the actuator wall 93 (which can be a region of the membrane 21) to provide an indirect feedback on the optical power setting of the lens 100. This could be implemented by optical or electrical means. In a preferred embodiment a strain sensor 88 is placed towards the edge onto the wall 93 of the actuator.

FIG. 13 shows a further embodiment of an optical device 1 according to the present invention corresponding to a modification of the embodiment shown in FIG. 10, wherein here, in contrast to FIG. 10, said wall 93 (e.g. portion of membrane 21) covering the reservoir volume 90 comprises a bellow structure 25. This increases the stroke of the actuator and thus allows to reduce the horizontal footprint of the actuator reservoir volume 90. This is especially beneficial for spectacles due to aesthetic reasons. Furthermore, the bellow structure 25 reduces the required actuation force since there is no actuator membrane that needs to be stretched. Alternatively, when keeping the same horizontal footprint of the reservoir volume 90 it allows to increase the clear aperture and/or the optical power tuning range of the lens 100. Also, in this embodiment the respective counter member 81 preferably is a permanent magnet to operate the lens in push-pull mode.

FIG. 14 shows yet another embodiment of an optical device 1 according to the present invention corresponding to a modification of the actuator shown in FIG. 13, wherein here, there are at least two reservoirs volumes 90b, 90 that are connected to one another and to the lens volume 91 (main lens area) by means of channels 92, 92b, 92c. At least one of the reservoirs 90 acts as an active micro-pump using an EPM motor 80 and a plunger 94 with a permanent magnet 81 as counter member. At least one further reservoir 90b acts as a non-actuated passive reservoir volume 90b.

In a different embodiment the EPM motor 80 is replaced by a voice-coil actuator comprising e.g. a coil and a magnet.

Both, the active pump reservoir volume 90 and the passive reservoir volume 90b are covered by a wall 93, 93b, respectively, wherein these (e.g. stretchable) walls 93, 93b can beach be a region of the membrane 21. In a preferred embodiment the wall 93 and/or the wall 93b comprises a bellows structure 25, 25b. In a preferred embodiment all reservoirs 93, 93b are fitted with a bellow structure 25, 25b.

Furthermore, each of said channels 92, 92b, 92c comprises a valve 89, 89b, 89c that allows to control the liquid F flow electronically. An external electronics driver is preferably comprised by the optical device 1 that synchronizes the EPM movement together with the three valves 89, 89b, 89c.

One mode of operation is to pump liquid F from the main area/lens volume 91 to the passive reservoir volume 90b. The operation of the actuator and the valves 89, 89b, 89c is known by somebody skilled in the art. Once there is an overpressure of liquid F in the passive reservoir volume 90b it can be quickly released by opening the valve 89c between the passive reservoir 90b and the lens volume 91. This could benefit a quicker response time.

The invention claimed is:

1. An optical device, comprising:
   at least a first lens having an adjustable focal length,
   wherein the first lens comprises a container comprising at least one reservoir volume and a lens volume which are in flow communication via a channel and which are filled with a transparent fluid, and
   wherein the container comprises a stretchable transparent membrane and a transparent lens shaper that is immersed in the fluid and connected to the membrane, so that the lens shaper defines a curvature-adjustable area of the membrane, and
   wherein the container comprises a transparent back wall facing the membrane, wherein the fluid is arranged between the membrane and the back wall, wherein the optical device further comprises a wall, wherein the at least one reservoir volume is covered by the wall, wherein a plunger for interacting with an actuator part is arranged in the at least one reservoir volume and connected to the wall so that fluid is pumped from the lens volume into the at least one reservoir volume when the plunger is attracted by the actuator part whereby the curvature of the curvature-adjustable area and therewith said focal length is changed.

2. The optical device according to claim 1, wherein the optical device further comprises an actuator unit comprising said plunger and said actuator part for interacting with said plunger, wherein the plunger comprises a counter member attractable by the actuator part, so that fluid is pumped from the lens volume into the at least one reservoir volume when the counter member is attracted by the actuator part whereby the curvature of the curvature-adjustable area and therewith said focal length is changed.

3. The optical device according to claim 2, wherein the counter member is a permanent magnet.

4. The optical device according to claim 2, wherein the counter member is a magnetic flux guiding counter member.

5. The optical device according to claim 2, wherein the actuator part is an electropermanent magnet.

6. The optical device according to claim 5, wherein the electropermanent magnet is configured to generate an external magnetic field for attracting said counter member for adjusting the curvature of said curvature-adjustable area.

7. The optical device according to claim 5, wherein the electropermanent magnet comprises a first magnet having a first coercivity and a first magnetization (M), and wherein the electropermanent magnet further comprises a second magnet having a second coercivity and a second magnetization (M'), wherein the first coercivity is larger than the second coercivity, and wherein the electropermanent magnet further comprises a coil encompassing the second magnet such that by applying a corresponding current to the coil the second magnet can be partially magnetized to generate said external magnetic field or such that by applying a corresponding current to the coil the second magnetization (M') can be switched from a parallel state where the two magnetizations (M, M') are parallel to an antiparallel state where the two magnetizations (M, M') are antiparallel and vice versa, wherein when the second magnetization (M') is in the parallel state the electropermanent magnet generates said external magnetic field, and wherein when the second magnetization (M') is in the antiparallel state said external magnetic field vanishes.

8. The optical device according to claim 2, wherein the actuator part comprises a coil, wherein the actuator unit is configured to apply an electrical current to the coil such that the coil generates a magnetic field that attracts or repels the counter member for adjusting the curvature of said curvature-adjustable area.

9. The optical device according to claim 2, wherein the optical device further comprises a frame for holding said container, wherein the actuator part is embedded into a portion of the frame so that the actuator part faces the counter member.

10. The optical device according to claim 2, wherein the plunger comprises a further counter member for interacting with a further actuator part comprised by the actuator unit, so that fluid is pumped from the lens volume into the at least one reservoir volume when the two counter members are attracted by the respective actuator part whereby the curvature of the curvature-adjustable area and therewith said focal length is changed.

11. The optical device according to claim 10, wherein the further actuator part is one of: an electropermanent magnet; an actuator part comprising a single magnetizable member and a coil encompassing the magnetizable member.

12. The optical device according to claim 10, wherein the further counter member is one of: a magnetic flux guiding counter member; a permanent magnet.

13. The optical device according to claim 1, wherein the material of the lens shaper, the membrane, and the fluid each comprise a refractive index, wherein the absolute value of the difference of any two refractive indices of these three refractive indices is smaller than 0.1, preferably smaller than 0.02.

14. The optical device according to claim 1, wherein the first lens comprises a container comprising a plurality of reservoir volumes filled with said fluid (F), wherein each reservoir volume is in flow communication with the lens volume via a separate channel, wherein each reservoir volume is covered by a wall, wherein a plunger for interacting with an associated electropermanent magnet is arranged in each reservoir volume and connected to the respective wall so that fluid is pumped from the lens volume into the respective reservoir volume when the respective plunger is attracted by the respective electropermanent magnet whereby the curvature of the curvature-adjustable area and therewith said focal length is changed.

15. The optical device according to claim 1, wherein the wall comprises a bellows structure.

16. The optical device according to claim 1, wherein the fluid comprises a refractive index that is larger than 1.45, preferably larger than 1.55, and/or the lens shaper comprises a refractive index that is larger than 1.45, preferably larger than 1.55.

17. The optical device according to claim 1, wherein the fluid and the lens shaper have the same Abbe number.

18. The optical device according to claim 1, wherein the optical device further comprises a second lens having an adjustable focal length.

19. The optical device according to claim 18, wherein the optical device further comprises a further second lens having an adjustable focal length, wherein a further waveguide is arranged between the second lens and said further second lens.

20. The optical device according to claim 1, wherein the optical device is formed as a pair of spectacles, particularly for virtual reality or augmented reality, or a headset, particularly for virtual reality or augmented reality, wherein the respective lens is held by a frame that can be worn by a user such that the respective lens is arranged in front of an associated eye of the user.

\* \* \* \* \*